US007675739B2

(12) United States Patent
Ewing et al.

(10) Patent No.: US 7,675,739 B2
(45) Date of Patent: Mar. 9, 2010

(54) FUSE MODULE WITH REMOVABLE FUSE CARRIER FOR FUSED ELECTRICAL DEVICE

(75) Inventors: Carrel W. Ewing, Reno, NV (US); Brandon W. Ewing, Reno, NV (US); Andrew J. Cleveland, Reno, NV (US); James P. Maskaly, Sparks, NV (US)

(73) Assignee: Server Technology, Inc., Reno, NV (US)

(*) Notice: Subject to any disclaimer, the term of this patent is extended or adjusted under 35 U.S.C. 154(b) by 407 days.

(21) Appl. No.: 11/636,262

(22) Filed: Dec. 7, 2006

(65) Prior Publication Data

US 2007/0159752 A1 Jul. 12, 2007

Related U.S. Application Data

(60) Provisional application No. 60/758,394, filed on Jan. 11, 2006, provisional application No. 60/852,726, filed on Oct. 18, 2006.

(51) Int. Cl.
*H02B 1/26* (2006.01)

(52) U.S. Cl. ....................... 361/623; 361/622; 361/624; 361/642; 361/648; 307/39; 307/112; 337/186; 174/59

(58) Field of Classification Search ............. 361/62–64, 361/111, 118, 602, 603, 622–627, 642–648, 361/656, 727, 833, 856; 307/39, 112, 10.1, 307/150, 29, 38, 41, 115, 125, 126, 141, 307/141.4, 143; 340/635, 638, 664, 538, 340/656, 657, 660; 174/59; 439/214, 620.08, 439/651, 55, 65, 82, 92, 94, 621, 535, 650, 439/652, 716

See application file for complete search history.

(56) References Cited

U.S. PATENT DOCUMENTS

| | | | | |
|---|---|---|---|---|
| 3,194,926 A | | 7/1965 | Ustin | |
| 3,202,788 A | * | 8/1965 | George | 337/194 |
| 3,248,500 A | * | 4/1966 | Cellerini et al. | 337/7 |
| 3,284,598 A | * | 11/1966 | George et al. | 337/211 |
| 3,319,025 A | * | 5/1967 | Majcher et al. | 337/7 |
| 3,339,118 A | | 8/1967 | Harner et. al. | |
| 3,432,789 A | | 3/1969 | Poehlman | |
| 3,588,775 A | | 6/1971 | Poehlman | |

(Continued)

FOREIGN PATENT DOCUMENTS

| | | | |
|---|---|---|---|
| DE | 3225319 A1 | * | 1/1984 |
| EP | 0 641 057 | | 10/2009 |
| FR | 2268348 | | 12/1975 |
| GB | 2266815 | | 11/1993 |
| GB | 32266814 | | 11/1993 |

OTHER PUBLICATIONS

Scan12232009_100649-English translation of the German Patent DE3225319A1.*

*Primary Examiner*—Michael V Datskovskiy
(74) *Attorney, Agent, or Firm*—Holland & Hart LLP

(57) ABSTRACT

Described herein are various embodiments of a fuse module with a fuse carrier for fused electrical devices. According to one exemplary embodiment, at least one fuse module can be mounted to a power distribution unit for receiving at least one power input and providing power to associated electronic equipment. The power distribution unit can have a housing with at least one fuse access passage and at least one power output displaced along the housing and electrically couplable to the at least one power input. The fuse module can be disposed at least partially within the at least one fuse access passage and be electrically couplable to the at least one power input and at least one power output. The fuse module can have at least one removably attachable fuse carrier that, when attached, electrically couples a fuse housed by the fuse carrier to the at least one power input and the at least one power output.

24 Claims, 22 Drawing Sheets

U.S. PATENT DOCUMENTS

| | | | | | |
|---|---|---|---|---|---|
| 4,488,767 | A | * | 12/1984 | Lehman et al. | 439/347 |
| 4,543,557 | A | | 9/1985 | Schaefer | |
| 4,661,807 | A | | 4/1987 | Panaro | |
| 4,685,028 | A | | 8/1987 | Miller et al. | |
| 4,688,135 | A | * | 8/1987 | Leopold | 361/118 |
| 5,002,505 | A | * | 3/1991 | Jones et al. | 439/620.29 |
| 5,582,522 | A | | 12/1996 | Johnson | |
| 5,595,494 | A | * | 1/1997 | Wiebe | 439/211 |
| 5,726,852 | A | * | 3/1998 | Trifiletti et al. | 361/115 |
| 5,844,763 | A | * | 12/1998 | Grace et al. | 361/111 |
| 5,984,728 | A | * | 11/1999 | Chen et al. | 439/620.22 |
| 6,132,257 | A | * | 10/2000 | Wang et al. | 439/620.34 |
| 6,394,847 | B2 | * | 5/2002 | Law | 439/620.27 |
| 6,406,331 | B1 | | 6/2002 | Brown | |
| 6,454,584 | B1 | * | 9/2002 | Milan | 439/214 |
| 6,456,203 | B1 | | 9/2002 | Schomaker et al. | |
| 6,717,505 | B1 | * | 4/2004 | Bruchmann | 337/194 |
| 6,727,797 | B1 | | 4/2004 | Bruchmann | |
| 6,741,442 | B1 | * | 5/2004 | McNally et al. | 361/166 |
| 6,781,809 | B2 | | 8/2004 | Milanczak | |
| 6,826,036 | B2 | * | 11/2004 | Pereira | 361/624 |
| 6,882,530 | B2 | * | 4/2005 | Cyphers et al. | 361/829 |
| 6,940,272 | B2 | | 9/2005 | Niv | |
| 6,991,495 | B1 | | 1/2006 | Aromin | |
| 7,049,973 | B2 | | 5/2006 | Torrez et al. | |
| 7,193,830 | B2 | | 3/2007 | Fournier et al. | |
| 7,355,503 | B2 | | 4/2008 | Buettner | |
| 7,368,830 | B2 | | 5/2008 | Cleveland et al. | |
| 2005/0101193 | A1 | * | 5/2005 | Godard | 439/652 |
| 2005/0105235 | A1 | * | 5/2005 | Yu | 361/118 |

* cited by examiner

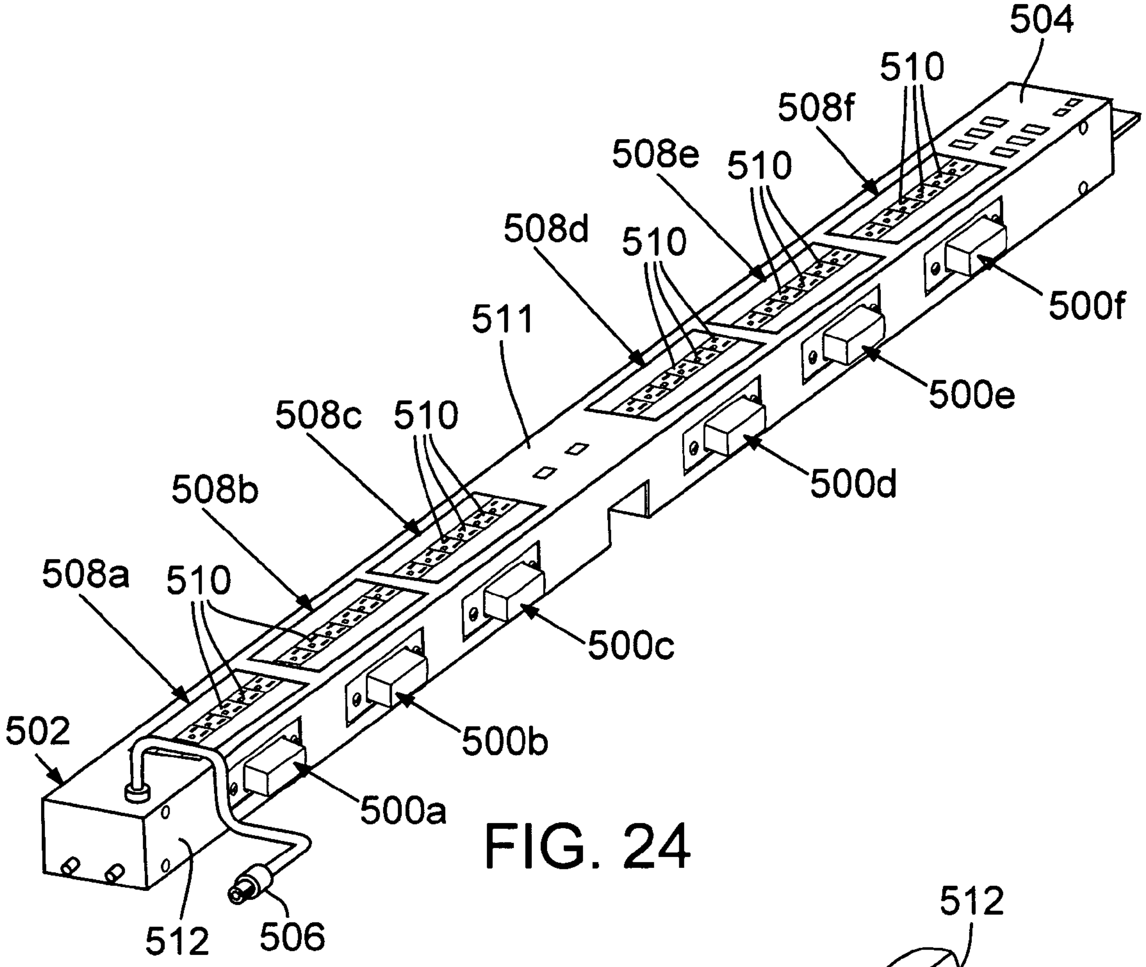
FIG. 24
FIG. 25
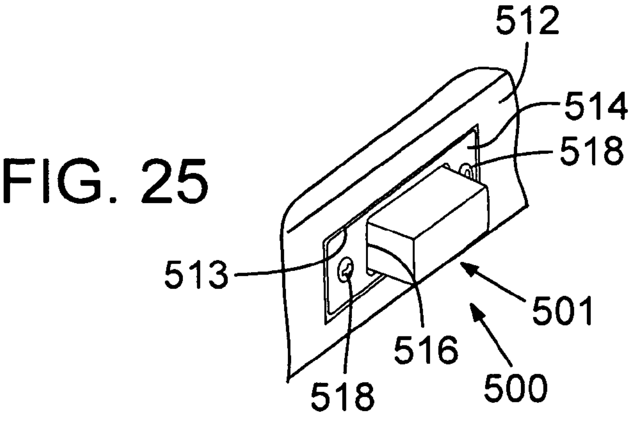

FUSE MODULE WITH REMOVABLE FUSE CARRIER FOR FUSED ELECTRICAL DEVICE

CROSS REFERENCE TO RELATED APPLICATION

This patent application claims the benefit of U.S. Provisional Patent Application Nos. 60/758,394, filed Jan. 11, 2006, and 60/852,726, filed Oct. 18, 2006. These applications are incorporated herein by reference in their entirety.

FIELD

The present disclosure relates to a fused electrical apparatus having a housing allowing access to a fuse operable within the housing and more particularly, in one preferred form, to a fuse module having a removably attachable fuse carrier.

BACKGROUND

Fuses are a common component found in many electrical devices. In general, fuses are electrical safety components consisting of a wire or strip that melts and interrupts a circuit when the current passing through the fuse exceeds a particular amperage. Once a fuse is blown, i.e., the wire or strip melts, the fuse must be replaced to reestablish the circuit.

Replacing blown fuses in fused electrical devices often requires disassembly of the electrical device and/or use of one or more hand-tools to access and retrieve a blown fuse. Accordingly, accessing and replacing a blown fuse can often be a difficult, cumbersome and time-consuming process.

It is therefore desirable to provide a more effective device and method for accessing and replacing blown fuses in fused electrical devices.

SUMMARY

Described herein are various embodiments of a fuse module for fused electrical devices and electrical devices comprising the same. The fuse module of the present application provides relatively easy access to fuses without requiring tools or disassembly of the electrical device to which the fuse module is associated.

According to one exemplary embodiment, a power distribution unit for providing power to associated electronic equipment can include a housing having at least one fuse access passage defined in the housing and be configured to receive at least one power input. At least one power output can be displaced along the housing and be electrically couplable to the power input. At least one fuse module can be mounted to the housing and disposed at least partially within the fuse access passage. The fuse module can be electrically couplable to the at least one power input and electrically couplable to the at least one power output. The fuse module can include at least one removably attachable fuse carrier that, when attached, electrically couples a fuse housed by the fuse carrier to the at least one power input and the at least one power output.

In some implementations, the fuse carrier can include a fuse housing that defines a substantially enclosed cavity. The fuse housed by the fuse carrier can be positionable within the housing cavity. In certain exemplary implementations, the fuse can be a cartridge-type fuse, for example, a fuse rated for branch circuit protection in a power distribution system.

In some implementations, the fuse carrier can include first and second electrically conductive terminals. The first terminal can be electrically coupled to a first end of a fuse housed by the fuse carrier and the second terminal can be electrically coupled to a second end of a fuse housed by the fuse carrier.

In specific implementations, the fuse carrier can have at least two electrically conductive fuse connectors that electrically couple the fuse to the terminals. Each fuse connector can extend from a respective end of a fuse housed by the fuse carrier to a respective terminal.

In other specific implementations, the at least one fuse module can include a printed circuit board disposed within the power distribution unit housing. The printed circuit board can be in electrical power receiving communication with the at least one power input and electrical power transmitting communication with the at least one power outlet. The at least one fuse carrier can be removably couplable to the printed circuit board to electrically couple the fuse housed by the fuse carrier to the at least one power input and the at least one power output via the printed circuit board. The at least one fuse module can also comprise at least two receptacles mounted and electrically coupled to the printed circuit board. Each of the at least two receptacles can have a socket for receiving a respective one of the at least two electrically conductive terminals.

In specific implementations, the printed circuit board can be interchangeably connected to the power distribution unit housing via one of its edges. The printed circuit board can be in electrical power receiving communication with the at least one power input and electrical power transmitting communication with the at least one bank of power outlets via the printed circuit board edge connected to the housing.

In some implementations, the fuse carrier, when attached, can extend from an interior of the housing, through the fuse access passage, to an exterior of the housing. Further, in some implementations, the attached fuse carrier can be accessible from outside the power distribution unit housing. The removably attachable fuse carrier can be removable from the power distribution unit without disassembly of the power distribution unit housing. In a specific implementation, the at least one fuse module can comprise a mounting plate covering at least a portion of the fuse access passage. The mounting plate can have a fuse carrier access opening through which the fuse carrier is extendable.

In some implementations, the at least one fuse module can comprise at least two fuse carriers. The at least two fuse carriers can include a first fuse carrier and a second fuse carrier. The first fuse carrier can electrically couple a fuse housed by the first fuse carrier to the at least one power input and a first power output. The second fuse carrier can electrically couple a fuse housed by the second fuse carrier to the at least one power input and a second power output.

In some implementations, the power distribution unit can include at least one fuse condition indicator in electronic communication with a fuse housed by the fuse carrier when the fuse carrier is attached. In some implementations, the fuse condition indicator can be coupled to the housing and in specific implementations, the fuse condition indicator is coupled directly to the fuse module.

In some implementations, the power distribution unit housing can have a plurality of fuse access passages, the at least one bank of power outlets can comprise a plurality of banks of power outputs, and the at least one fuse module can comprise a plurality of fuse modules.

In certain implementations, the at least one power output comprises a plurality of power outputs. In some implementations, at least two of the plurality of power outputs are interconnected to form a ganged outlet module.

According to one exemplary embodiment, a method for providing overcurrent protection in a power distribution unit can include mounting at least one fuse module at least partially within a fuse access passage of the power distribution unit housing. In some implementations, the fuse module can comprise a printed circuit board having at least two terminal sockets mounted thereon. The method can also include the act of electrically connecting a first of the at least two terminal sockets on the printed circuit board to an at least one power input and electrically connecting a second of the at least two terminal sockets on the printed circuit board to at least one power output. A fuse carrier can be removably attached to the at least two terminal sockets to electrically couple a fuse enclosed within the fuse carrier to the at least one power input and the at least one power output.

In some implementations, the fuse carrier can comprise a first fuse carrier enclosing a first fuse, and the method can further include the act of determining the status of the first fuse enclosed within the first fuse carrier. The method can further include the act of detaching the first fuse carrier from the at least two terminal sockets. The method can also include the act of removably attaching a second fuse carrier to the at least two terminal sockets to electrically couple a second fuse enclosed within the second fuse carrier to the at least one power input and the at least one power output.

In some implementations, detaching the first fuse carrier can comprise manually grasping the first fuse carrier and pulling the first fuse carrier out of engagement with the at least two terminal sockets. In some implementations, the act of determining the status of the first fuse can comprise visually inspecting a fuse condition indicator in electronic communication with the first fuse.

It is intended that the above method steps, and other method steps described herein, need not be performed in any particular order unless otherwise indicated.

According to one exemplary embodiment, an electronic equipment rack assembly can comprise an electronic equipment rack for housing electronic equipment and a power distribution unit mounted to the electronic equipment rack. The power distribution unit can be in power receiving communication with at least one power source and can have a plurality of power outlets capable of being in power supplying communication with electronic equipment. In some implementations, the power distribution unit can include a housing having at least one fuse access passage. The electronic equipment rack can further include at least one fuse module mounted to the power distribution unit housing and disposed at least partially within the at least one fuse access passage. The at least one fuse module can be electrically coupled to the at least one power source and electrically couplable to the plurality of power outlets. The fuse module can also include at least one removably attachable fuse carrier that, when attached, electrically couples a fuse housed by the fuse carrier to the at least one power source and the plurality of power outlets.

In one exemplary embodiment, a fuse module for use with a fused electrical device for receiving at least one power input and having at least one electrical component can include a printed circuit board mountable to the fused electrical device. The printed circuit board can have at least a first power input circuit that is electrically couplable to at least one power input of a fused electrical device and a second outlet circuit that is electrically couplable to at least one electrical component of the fused electrical device.

The fuse module can include at least first and second receptacles mounted to the printed circuit board. The first receptacle can be electrically coupled to the first power input circuit and the second receptacle being electrically coupled to the second outlet circuit. The fuse module can also include a fuse carrier that can have a housing and at least first and second terminals extending from the housing. The housing can define a fuse storage compartment substantially enclosing a fuse. The first terminal can have a fuse connecting end electrically coupled to a first end of the fuse and a receptacle connecting end generally opposite the fuse connecting end. Similarly, the second terminal can have a fuse connecting end electrically coupled to a second end of the fuse generally opposite the first end of the fuse and a receptacle connecting end generally opposite the fuse connecting end.

In the exemplary embodiment, the fuse carrier can be removably attached to the first and second receptacles by inserting the first and second terminals into a respective one of the first and second receptacles. Insertion of the terminals into the receptacles can electrically couple the fuse to the at least one power input and the at least one electrical component of the fused electrical device.

It is to be understood that the foregoing is merely a brief summary of some features or aspects of the present disclosure. The foregoing and other features and advantages will become more apparent from the following detailed description, which proceeds with reference to the accompanying figures.

BRIEF DESCRIPTION OF THE DRAWINGS

FIG. 24 is a perspective view of one exemplary embodiment of a power distribution unit having a plurality of fuse modules with fuse carriers mounted to a housing of the power distribution unit.

FIG. 25 is a detailed perspective view of one of the plurality of fuse modules shown in FIG. 24 mounted to the housing of the power distribution unit.

DETAILED DESCRIPTION

Embodiments of a fuse module with a removable fuse holder or carrier for use with a fused electrical apparatus are described herein. As defined herein, a fused electrical apparatus can be any electrical apparatus configured or configurable to provide overcurrent protection to one or more components of the electrical apparatus or components connected to the electrical apparatus. Although the illustrated embodiments are described in relation to an electrical power distribution unit (PDU) having one or more power inputs and power outputs, it is recognized that any of various other types of fused electrical apparatus, such as, for example, radios, televisions, computers, machining equipment and appliances, can be used.

Figure 1:
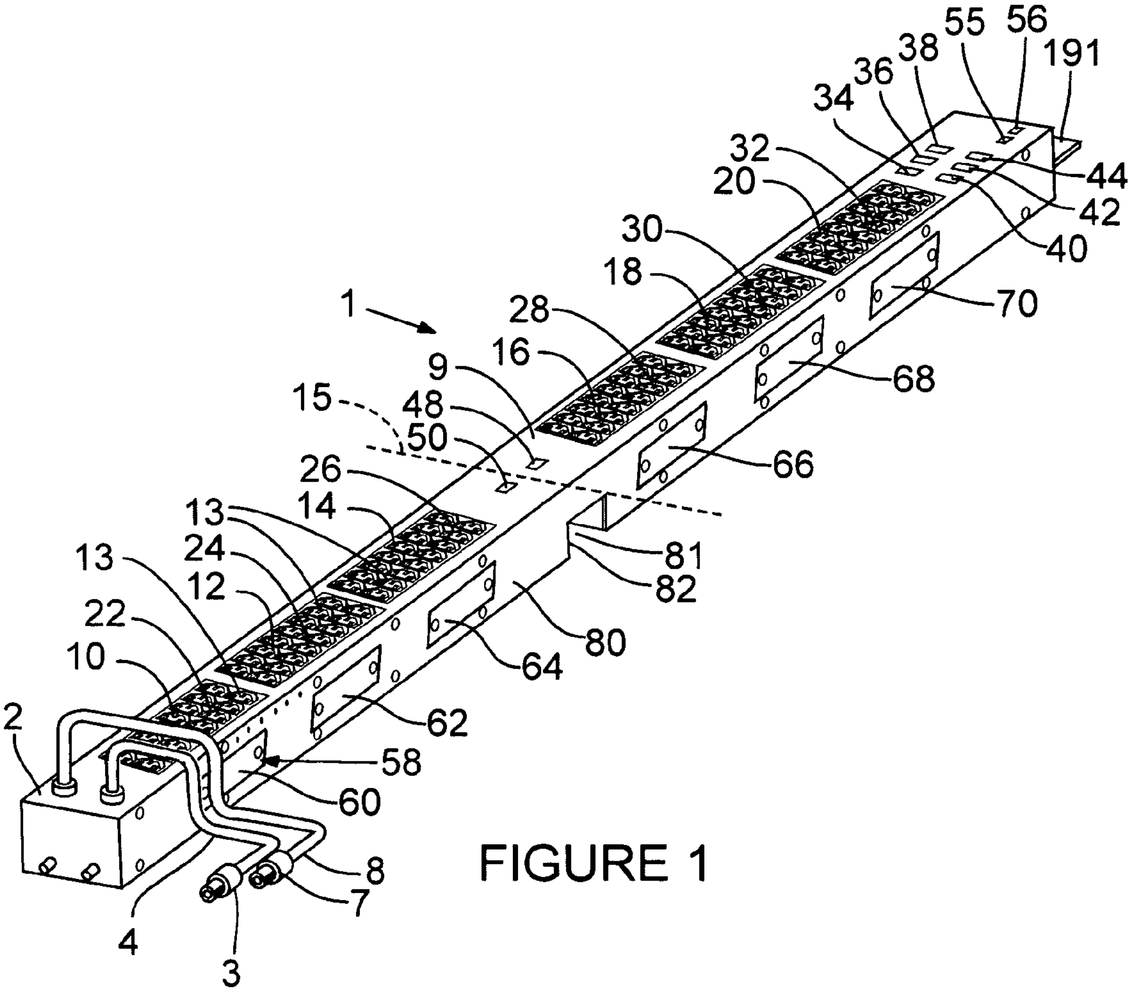
FIG. 1 is an axonometric view of a power distribution apparatus constructed in accordance with one specific exemplary implementation.

Referring to FIG. 1, the fused electrical apparatus is an electrical PDU, such as PDU 1, that is adapted to receive one or more polyphase, or single-phase, power inputs and has a plurality of outputs, such as single-phase power outputs. The description of a PDU is merely for exemplary purposes and is not limiting in any way. Moreover, the particular embodiments of PDUs described herein are merely examples of PDUs It should be noted that this specification employs spatially orienting terms to explain relative locations. In order to provide orientation with respect to the housing 2, the vertical dimension is also referred to as the longitudinal dimension. The horizontal dimension across the front panel 9 is the lateral dimension. The third dimension perpendicular to the surface of the front panel 9 is the transverse dimension.

With continuing reference to FIG. 1, a first three-phase plug 3, which in this example is for a three-phase application, is connected to a three-phase alternating current source (not shown). A first power cord 4 couples power to the housing 2. A second three-phase plug 7 may be connected to the three-phase alternating current source. A second power cord 8 couples power to the housing 2 from the second plug 7. The three phases provided through the first plug 3 are arbitrarily referred to as phases A, B, and C. The three phases provided through the second plug 7 are arbitrarily referred to as X, Y, and Z.

Figure 2:
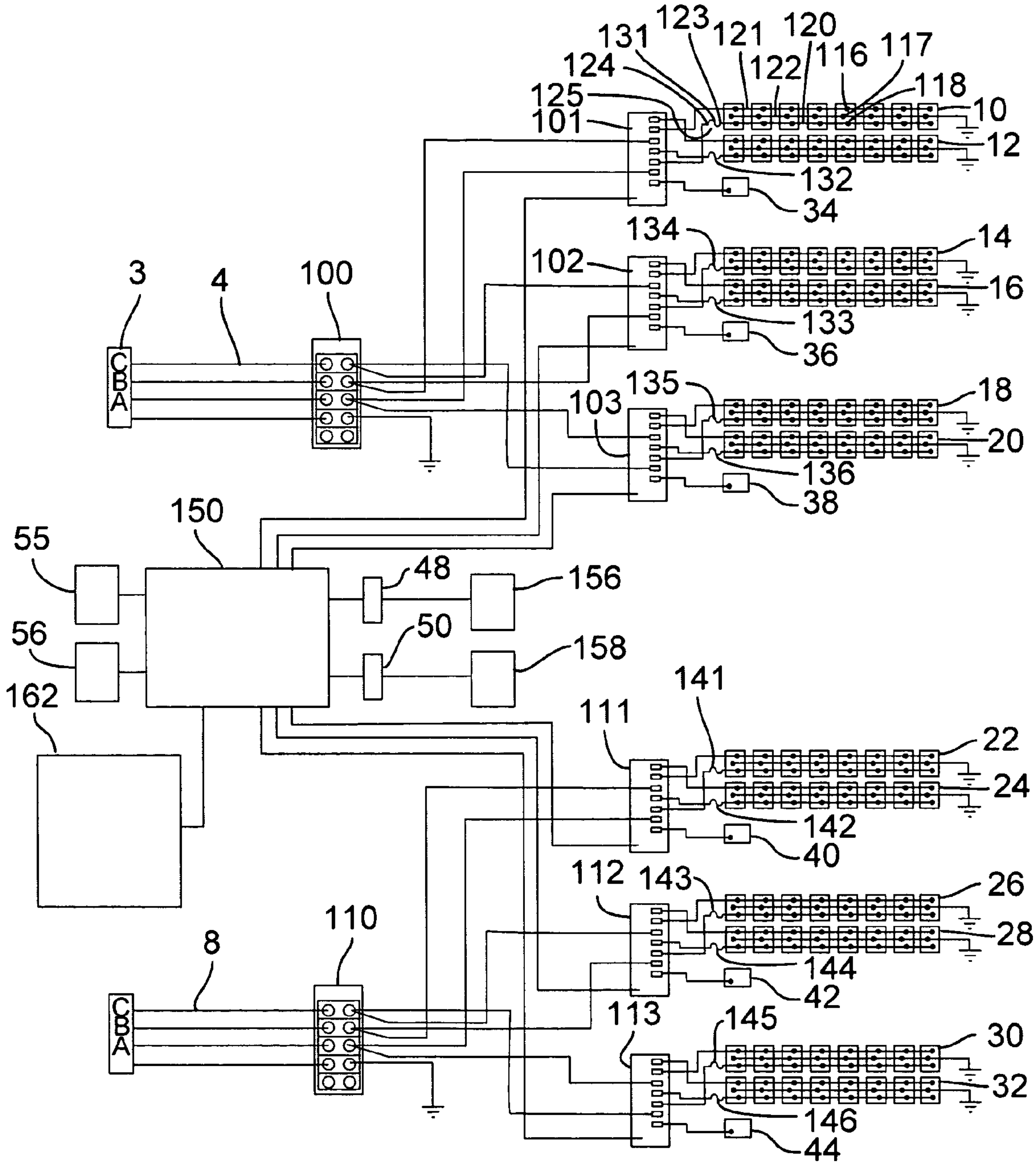
FIG. 2 is a schematic illustration of the apparatus of FIG. 1.

With reference now to FIG. 2, circuitry in the housing 2 divides the three phase alternating current into a plurality of single phase inputs to components plugged in to the PDU 1. At a front panel 9 of the housing 2, single phase voltage is provided at one or more outlets, which can be arranged individually or interconnected in outlet modules or banks as will be further described below.

The present embodiment utilizes separate first and second plugs 3 and 7 so that multiple power inputs can be provided, such as for a data center, telecommunications central office, or broadcast network equipment rack. Alternatively, a single power input could be provided.

The elongated dimension of the housing 2 may be referred to as the vertical direction because in some implementations, when the housing 2 is mounted in a rack assembly, the front panel 9 is disposed in a vertical plane. Notwithstanding the elongated dimension being referred to as the vertical direction, it is recognized that in some implementations, the front panel of the housing 2 or, in other implementations, the front panel of a housing of another fused electrical device, can be disposed in a horizontal, diagonal, or other plane when mounted in a rack. Accordingly, the fused electrical devices as described herein are not limited to any particular orientation independent of or with respect to an electronic equipment rack.

First and second power receptacle banks, or ganged outlets, 10, 12 extend vertically adjacent a lower end of the housing 2. Each bank comprises a plurality of power receptacles, such as eight power receptacles 13 as shown in some of the illustrated embodiments, interconnected together.

Each receptacle 13 may comprise a standard 120 volt grounded outlet. Third and fourth power receptacle banks 14, 16 extend vertically above the first and second power receptacle banks 10, 12 and may be on opposite sides of a vertical centerline 15 of the front panel 9. Fifth and sixth power receptacle banks 18, 20 extend successively vertically above the third and fourth power receptacle banks 14, 16. Seventh and eighth power receptacle banks 22, 24 are vertically aligned and horizontally adjacent to the banks 10, 12 respectively. Ninth and tenth power receptacle banks 26, 28 are vertically aligned and horizontally adjacent to the third and fourth banks 14, 16 respectively. Similarly, eleventh and twelfth power receptacle banks 30, 32 are vertically aligned with and horizontally adjacent to the fifth and sixth power receptacle banks 18, 20.

Other numbers of power receptacle banks could be provided and each power receptacle bank could include a different number of receptacles 13. Other phase connections could be made. The various banks of receptacles may be connected to different ones of the phases A, B and C and X, Y and Z. In the present embodiment, the banks of receptacles are connected as will described with reference to FIG. 2 below.

In a preferred form, the electrical apparatus includes displays 34, 36, 38, 40, 42, 44 for respectively displaying the currents drawn in each of phases A though C and X through Z. The displays may be located on the front panel 9 between the power receptacle banks 20 and 32 and an upper, or longitudinally distal, end of the housing 2. A first set of three displays 34, 36, 38 are aligned in a first vertical column, and a second set of three displays 40, 42, 44 are aligned in a second vertical column laterally adjacent to the first vertical column of the first set of displays 34, 36, 38. Preferably, each one among the displays 34-44 indicates RMS current levels for a particular phase of power provided by the PDU 1 (in this case, A, B, C, X, Y, and Z respectively).

The PDU 1 may be a power distribution apparatus having particular features, such as intelligent power distribution, remote power management, power monitoring, and environmental monitoring. An example of such a system is the Dual-Feed Power Tower XL manufactured by Server Technology, Inc. of Reno, Nev. For this type of power distribution unit, further interface ports, described below, are provided in the front panel 9.

Figure 20:
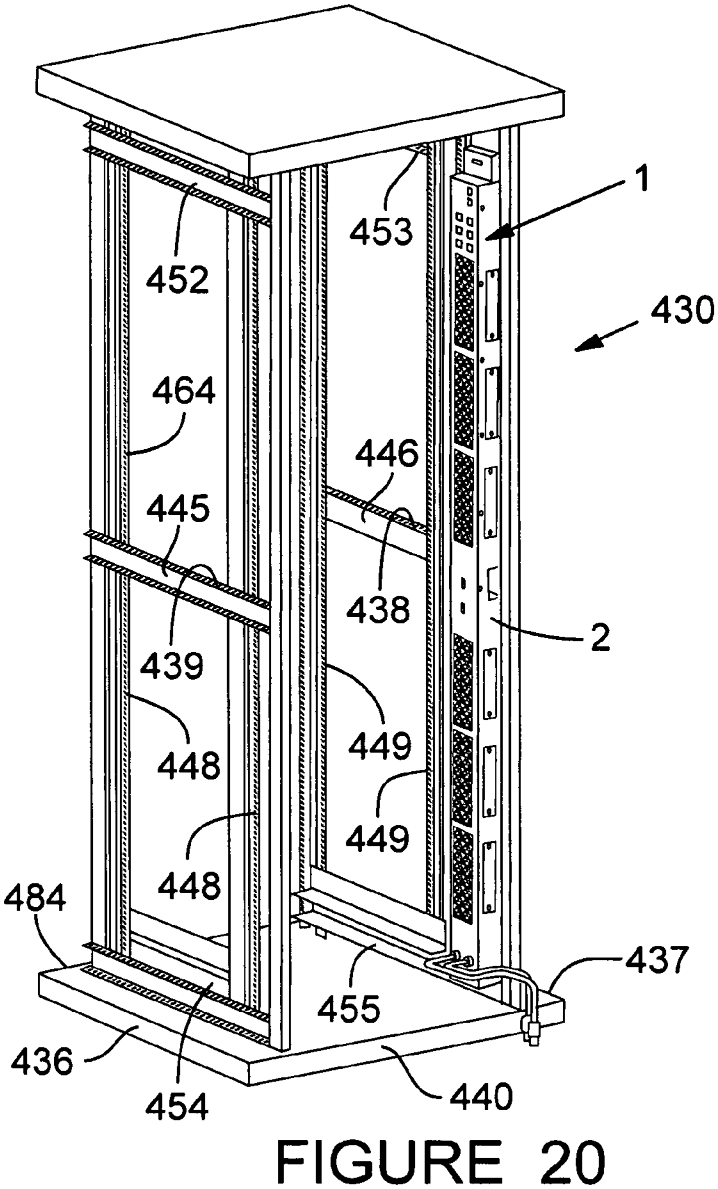
FIG. 20 is a perspective view of the apparatus of FIG. 1 mounted in an electronic equipment rack.
Figure 21:
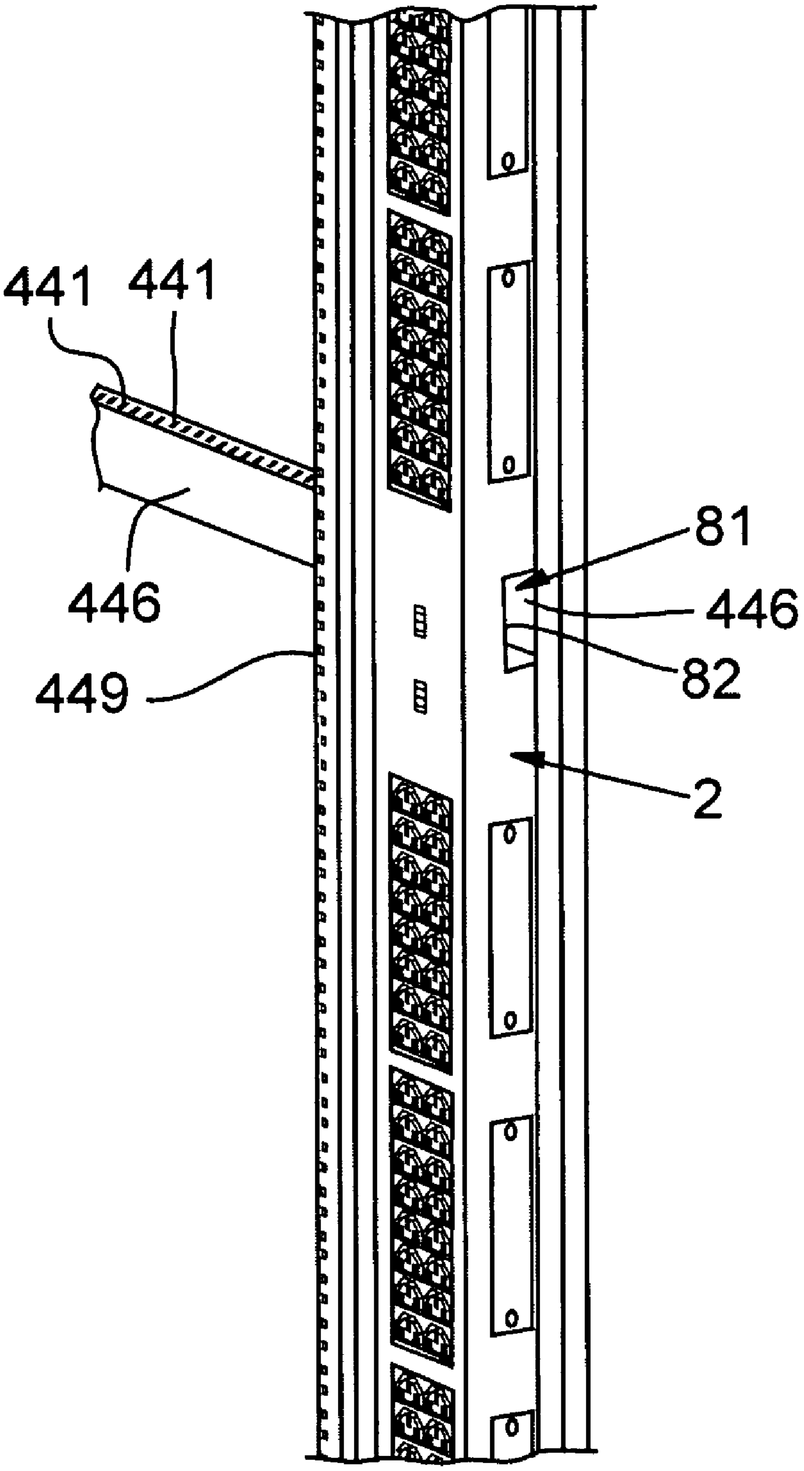
FIG. 21 is a partial detailed view of FIG. 20.
Figure 22:
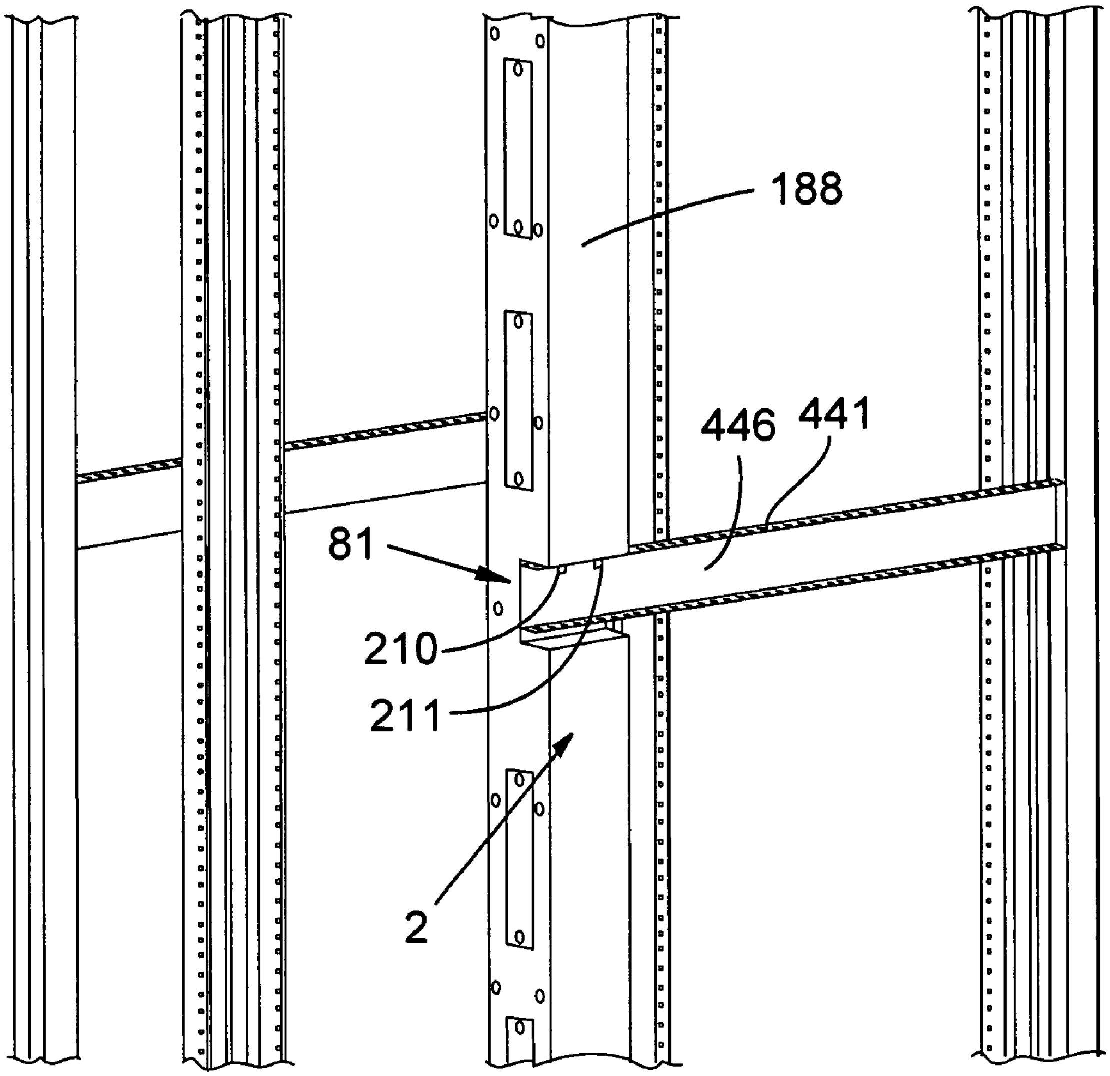
FIG. 22 is a partial detailed view of FIG. 20 but showing an opposite side of the apparatus.

Although increasing the number of vertically racked or stacked servers, such as shown in the embodiment of FIGS. 20-22, can conserve valuable floor space, the resulting power consumption and heat dissipation associated with the serves can create new concerns for data center managers. Once temperature increases above a particular threshold, data system server failure rates increase 2-3 percent for every one degree rise in temperature. First and second environmental monitoring ports, such as monitoring ports 48, 50 shown in FIG. 1, can be provided in the longitudinal center of the front panel 9 to receive input signals indicative of temperature and humidity, respectively, from a measurement device, such as one commonly used in the art.

In some implementations, communications interfaces are provided by first and second communications ports 55, 56 at the upper end of the front panel 9. The first and second ports 55, 56 may comprise RJ-45 connectors. In specific implementations, the first communications port 55 may be a serial, RS-232 port and the second communications port 56 may be an Ethernet port.

In the power distribution of FIG. 1, each bank of receptacles is "fused." In other words, each of the power receptacle banks 10, 12, 14, 16 18, 20, 22, 24, 26, 28, 30, 32 are each protected by a fuse as will be further described below. As shown, and which will be described in more detail below, the fuses are made accessible without the need to disassemble the housing 2, e.g., as by removing the front panel 9 from the housing 2.

In some embodiments, the PDU 1 comprises fuse state indicators, such as fuse state indicators 58, so that the state of the fuse may be determined by visual inspection. In the embodiment of FIG. 1, the PDU 1 has six fuse state indicators 58 with each indicator comprising a window, such as windows 60-70, through which two fuses can be visible. In other embodiments, other numbers of fuses can be mounted behind each window 60-70.

In the present example, removable window 60 provides not only access to fuses within the housing 2 but also an indication of the states of fuses for the first and sixth banks 22, 24. Similarly, windows 62, 64, 66, 68, 70 are indicators for fuses associated with banks 10 and 12, 26 and 28, 14 and 16, 30 and 32, and 18 and 20, respectively. Each of the windows 60-70 can be generally planer shaped and removable in a manner as will be described below in more detail to provide access to fuses. In some implementations, the windows 60-70 may be made from, for example, Lucite, polycarbonate resin, or other transparent, or semi-transparent, material.

The windows 60-70 are mounted in or over apertures 220-230 (see, in particular, FIG. 5), respectively, formed in a first side wall 80 of the housing 2. In some implementations, the side wall 80 can be joined to and extend substantially perpendicular to the front panel 9. The apertures 220-230 formed in first side wall 80 are located laterally adjacent the fuses mounted within the housing 2 such that the fuses are observable through the apertures 220-230 and fuse windows 60-70 mounted in or over the apertures.

Although not specifically shown, in some embodiments, the apertures can be formed in the front panel 9 or rear panel 188 of the PDU housing 2. For example, apertures can be formed in the front panel 9 adjacent one or more of the power receptacle banks, such as between two adjacent power receptacle banks.

Fuses of the type used in power distribution apparatus change in physical appearance, as by taking on a burnt look for example, when they blow or become inoperable. The fuse status of these types of fuses can be indicated by viewing through one of the corresponding windows 60-70.

In alternative embodiments, as will be discussed in more detail below, the status of a fuse may be indicated by a device that actively indicates the status of the fuse, such as, for example, a light emitting diode (LED). The LED may be on or off in correspondence with the state of the fuse so as to provide an indicator of fuse condition that is viewable at a substantial distance away from the housing 2.

In specific implementations, the housing 2 can include a rack mounting section 81. As can be seen in FIG. 1, the rack mounting section 81 includes a mounting contour, or channel, 82 formed in the housing 2. The mounting contour 82 can comprise a rectangular cutout in the plane of the first side wall 80 having one side in line with a rear wall 208 (see FIG. 3) of the housing 2. The contour 82 thus provides a generally U-shaped detent or mounting channel in the housing 2.

The rack mounting section 81 can also include other components for securing the housing 2 in a given spatial relationship in a rack, as will be described below in more detail with reference to FIG. 3. The mounting contour 82 facilitates mounting of the housing 2 in a conventional electronic equipment rack assembly, such as a RETMA rack.

As further described with respect to the embodiment of FIG. 20 below, the rack mounting section 81 allows the housing 2 to be removably positioned or mounted vertically on the rearward portion of a horizontal mounting rail in an equipment rack assembly. In this fashion, the housing 2 may be mounted substantially or even entirely within the internal confines of the equipment rack assembly, reducing wiring and equipment access space consumption within the equipment rack assembly, and allowing wiring to and from the housing 2 and associated electronic equipment in the rack assembly to be easily, safely, and securely maintained within the confines of the rack.

FIG. 2 is a schematic illustration of the PDU 1. In FIG. 2, the same reference numerals are used to denote items corresponding to those in FIG. 1. The first power cord 4 is connected to a first main terminal block 100 which in turn is connected to and transmits power to first, second, and third bank supply terminal blocks 101, 102, 103. Similarly, the second power cord 8 is connected to a second main terminal block 110, which is connected to and transmits power to fourth, fifth, and sixth bank supply terminal blocks 111, 112, 113.

The first bank supply terminal block 101 couples phases A and B to the first and second power receptacle banks 10, 12, respectively. The second bank supply terminal block 102 couples phases B and C to third and fourth power receptacle banks 14, 16, respectively. The third bank supply terminal block 103 couples phases C and A to fifth and sixth power receptacle banks 18, 20, respectively.

Similarly, the fourth bank supply terminal block 111 couples phases X and Y to seventh and eighth power receptacle banks 22, 24, respectively. The fifth bank supply terminal block 112 couples phases Y and Z to ninth and tenth power receptacle banks 26, 28, respectively. The sixth bank supply terminal block 113 couples phases Z and X to eleventh and twelfth power receptacle banks 30, 32, respectively.

As denoted in the diagram of the first power receptacle bank 10, which is illustrative of the wiring and fusing of all power receptacle banks identified above, each receptacle 13 has a first terminal 118 connected to a first phase input line 120, a second terminal 116 connected to a second phase input line 121 and a third terminal 117 connected to a grounded line 122. In some implementations where the power source provides a single phase line-neutral power input, the second phase input line 121 can be a neutral return line.

The receptacles 13 of the representative first power receptacle bank 10 are fused together via the line 120. Each line 120 includes fuse mount terminals 123, 124 connected to opposite ends of a fuse 131. Accordingly, fuse 131 electrically couples the phase input line 120 of the first power receptacle bank with the first bank supply terminal block 101. One or more pairs of first and second fuse mount terminals 123, 124 may be included in a fuse holder 125. The first and second fuse mount terminals 123, 124 may consist of lugs soldered to fuses, fuse clips or other fuse mounting structures available or known in the art.

Similar to fuse 131, fuse 132 electrically couples the phase input line 120 of the second power receptacle bank 12 with the first bank supply terminal block 101. Similarly, fuses 133, 134 electrically couple the phase input line 120 of the third and fourth power receptacle banks 14, 16, respectively, with the second bank supply terminal block 102. Fuses 135, 136 electrically couple the phase input line 120 of the fifth and sixth power receptacle banks 14, 16, respectively, with the third bank supply terminal block 103. Fuses 141, 142 electrically couple the phase input line 120 of the seventh and eighth power receptacle banks 22, 24, respectively, with the fourth bank supply terminal block 111. Fuses 143, 144 electrically couple the phase input line 120 of the ninth and tenth power receptacle banks 26, 28, respectively, with the fifth bank supply terminal block 112. Fuses 145, 146 electrically couple the phase input line 120 of the eleventh and twelfth power receptacle banks 30, 32, respectively, with the sixth bank supply terminal block 113.

A control circuit 150 is coupled to each of the first through third bank supply terminal blocks 101-103 and each of the fourth through sixth bank supply terminal blocks 111-113. The control circuit 150 may provide the intelligent power distribution, remote power management, power monitoring and environmental monitoring as provided in the above-cited Dual-Feed Power Tower XL system. The structure and operation of the control circuit 150 do not form part of the present invention although the control circuitry 150 has novel and unexpected interactions in the context of the present embodiment. The control circuit 150 interfaces with the first, second, and third bank supply terminal blocks 101, 102, 103 to provide RMS current signals coupled to the associated first, second, and third RMS current level displays 34, 36, 38, respectively. Similarly, the control circuit 150 is coupled by the fourth, fifth, and sixth bank supply terminal blocks 111, 112, 113 to provide current signals to the associated fourth, fifth, and sixth RMS current level displays 40, 42, 44, respectively.

The first though sixth bank supply terminal blocks 101, 102, 103, 111, 112, and 113 are also coupled to provide inputs to the control circuit 150. Calculation of an RMS current signal is done in a known manner. For example, phase current measurement is provided in the above-cited Dual-Feed Power Tower XL system.

The first and second environmental monitoring ports 48, 50 are connected to the control circuit 150 and receive inputs from a temperature sensor 156 and a moisture sensor 158, respectively. The above-cited Dual-Feed Power Tower XL system also provides for IP (internet protocol) network functionality. The control circuit 150 is connected to the first and second communications ports 55, 56 to communicate the status of the system. A condition-sensing circuit 162 is coupled to the control circuit 150 to report on such conditions as an open circuit in series with one of the bank supply terminal blocks 101-103 or 111-113.

Although the circuit diagram of FIG. 2 includes main and bank supply terminal blocks, in some embodiments, the terminal blocks are not included and the various electrical components interconnected via the terminal blocks are, in some cases, directly electrically connected to each other.

The structure of the housing 2 of FIG. 1 is further understood with reference to FIGS. 3-8. Generally, the PDU 1 can be comprised of adjoining panels and walls, such as first side panel 80 described above, forming a generally elongate rectangular shape.

Figure 3:
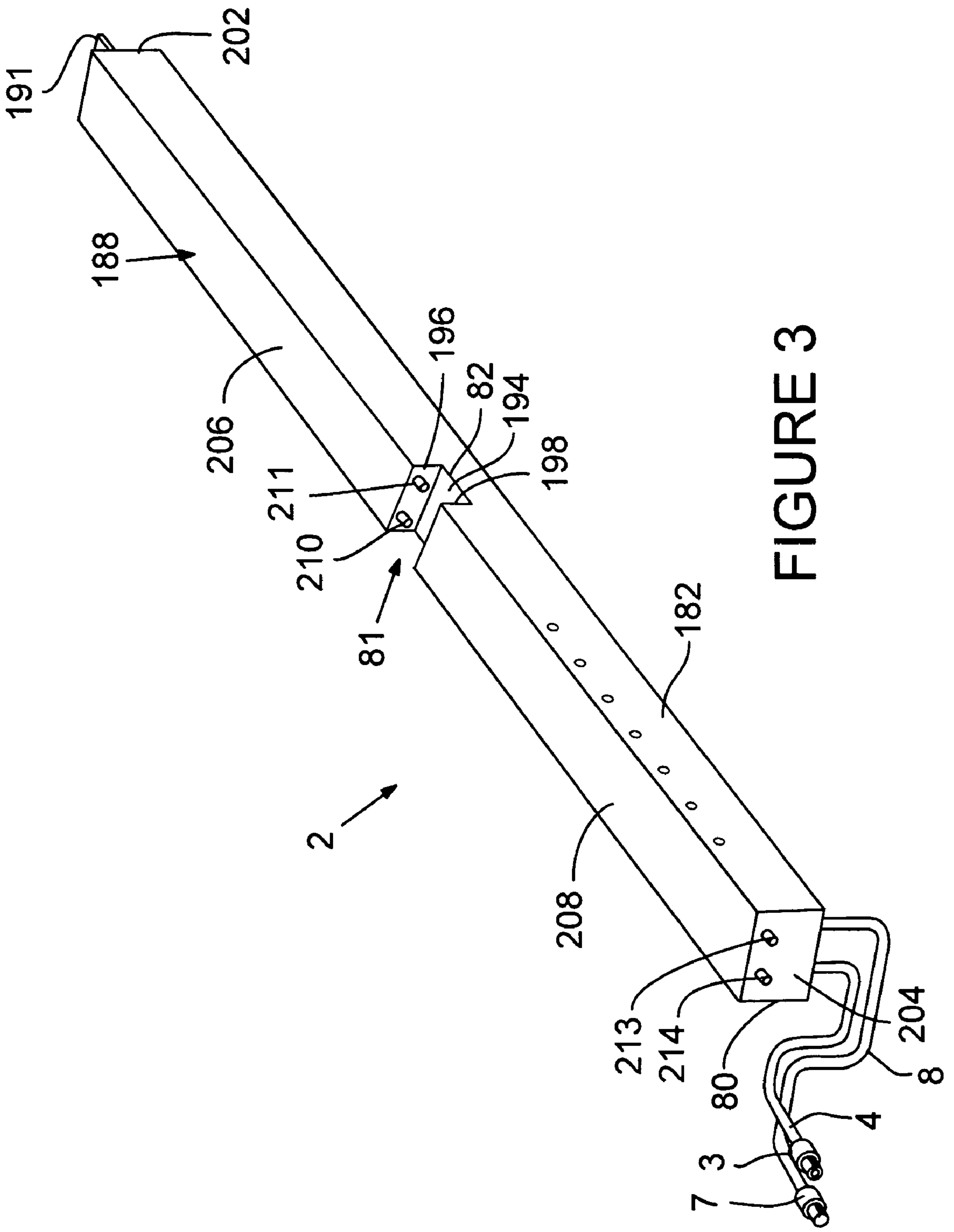
FIG. 3 is an axonometric view of a back side of the apparatus of FIG. 1.
Figure 4:
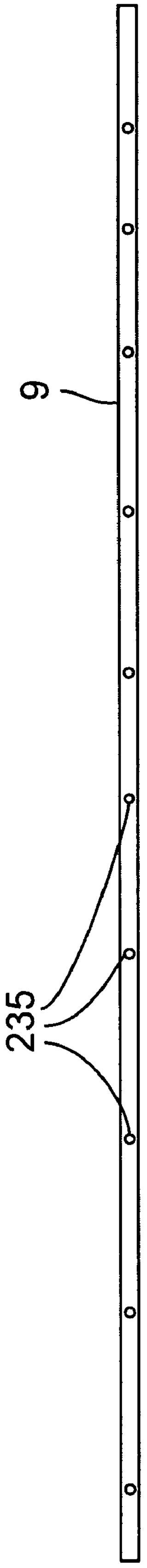
FIG. 4 is a side view of the top panel of a housing of the apparatus of FIG. 1.

As illustrated in FIG. 3, a second side wall or panel 182 is substantially parallel to the first side wall 80. Like first side wall or panel 80, the second side wall 182 (also illustrated in FIG. 8) is joined to and extends perpendicular to the front panel 9 (also illustrated in FIG. 4) at an side of the front panel 9 laterally opposite the side of the front panel to which the first side wall 80 is joined. The second side wall 182 also includes the mounting contour 82, as does the first side wall 80.

The PDU 1 can also include the back or rear panel 188 (see FIGS. 3, 6 and 7) that is joined and extends perpendicular to the first side wall 80 and second sidewall 182.

Figure 15:
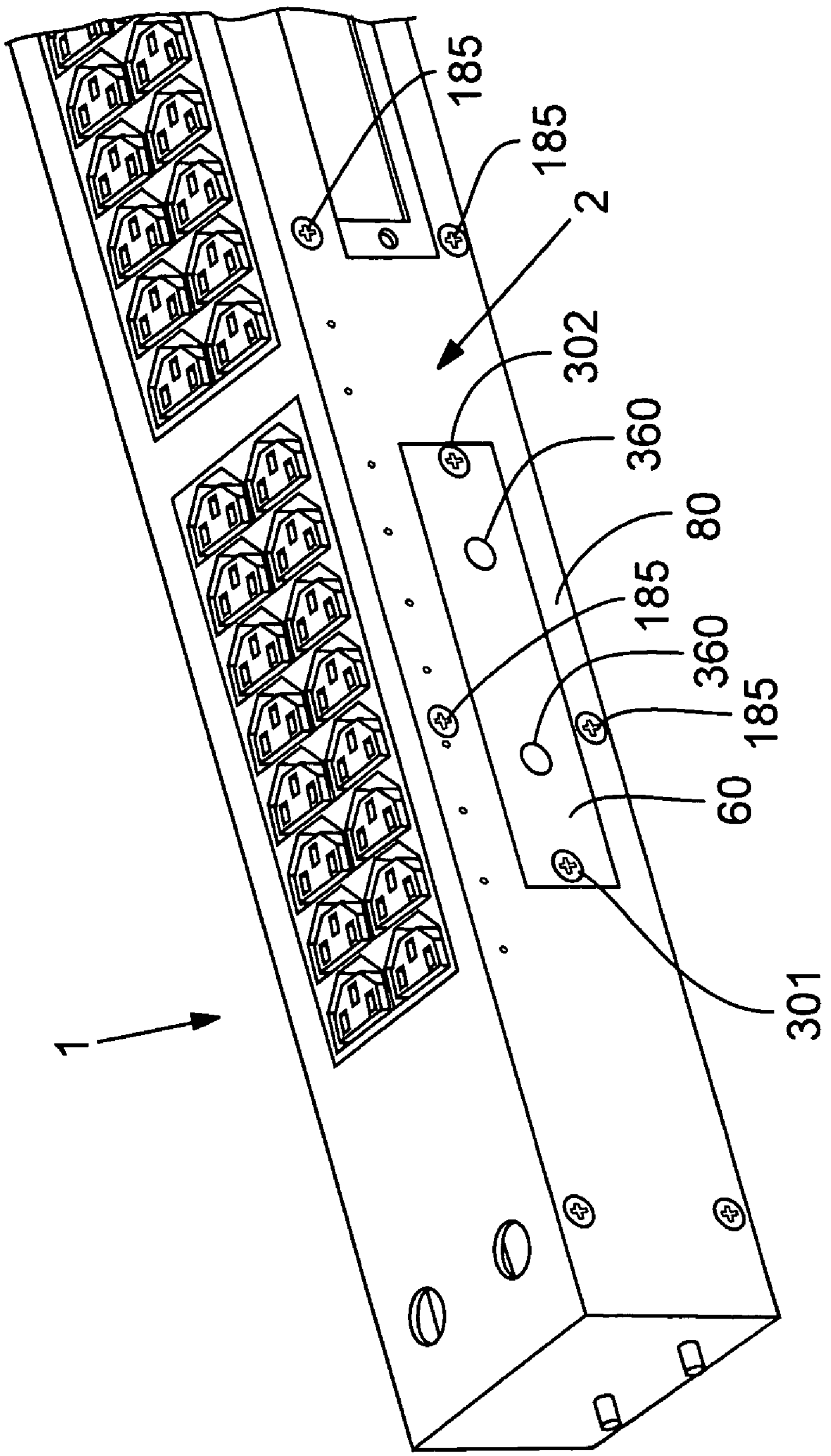
FIG. 15 is a perspective view of another embodiment of a fuse assembly associated with the apparatus of FIG. 1 and in which an element changes state to indicate a fuse condition.

In the illustrated embodiments, fasteners, such as fasteners 185, e.g. metal screws, as shown in FIG. 15, project through apertures formed in adjoining panels and walls to join the front panel 9, back panel 188 and the first and second side walls 80 and 182 to close the housing 2. In some implementations, an end mounting bracket 191 may be affixed to the longitudinally distal end of the housing 2 to facilitate mounting the PDU in a rack unit (see FIG. 1). The housing 2 may have rack mounting features that can facilitate mounting to rack rails in a horizontal unit. Alternatively, as in the present example, the housing 2 may have rack mounting features that can facilitate mounting to a wall in a vertical rack unit (further illustrated below in FIGS. 20-23) to provide for convenient location with respect to power cords of rack mounted equipment and to avoid taking up vertical space within the confines of rack rails.

In some implementations, the rack mounting features can include the rack mating section 81 of the housing 2, which is formed in a portion of the back panel 188. As described above, the rack mating section 81 includes a mounting contour channel 82 defined by a central indented surface 194 and first and second central transverse surfaces 196, 198. The central indented surface 194 is disposed intermediate the first and second rear surfaces 206, 208 and extends generally parallel to the rear surfaces. The first central transverse surface 196 extends generally perpendicular to the central indented surface 194 and first rear surface 206 and is disposed intermediate the first rear surface and the central indented surface. The second central transverse surface 198 extends generally perpendicular to the central indented surface 194 and second rear surface 208 and is disposed intermediate the second rear surface and the central indented surface. Upper and lower ends, i.e., longitudinally distal and proximal opposite ends, of the housing 2 are closed respectively by first and second outer transverse surfaces 202 and 204 included in the back panel 188. The first central and outer transverse surfaces 196, 202 are joined by the first rear surface 206. Second central and outer transverse surfaces 198, 204 are joined by the second rear surface 208.

For rack mounting purposes, first and second longitudinally extending locator pins 210, 211 extend longitudinally from the first central transverse surface 196. The first and second locator pins 210, 211 operate in conjunction with the mounting section 81 to operate as a detent. Third and fourth locator pins 213, 214 extend longitudinally from second outer transverse surface 204. The locator pins 210, 211, 213, 214 may function to constrain the PDU 1 in a position within a rack as will be described below in more detail with reference to FIGS. 20-22.

Figure 5:
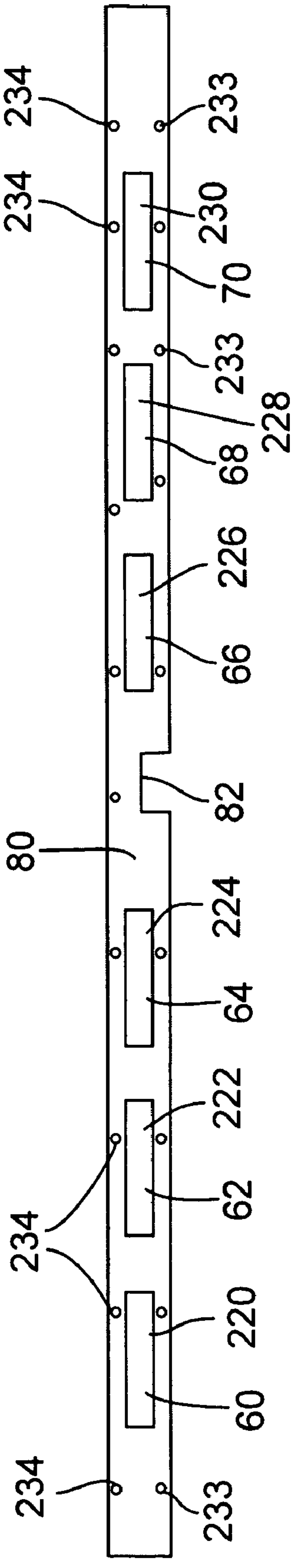
FIG. 5 is an elevational view of a side wall of the housing of the apparatus of FIG. 1 including fuse state indicators.

As shown in FIG. 5, the first side wall 80 includes first through sixth rectangular apertures 220, 222, 224, 226, 228, 230, which receive the first through sixth windows 60, 62, 64, 66, 68, 70, respectively. The windows 60-70 may be retained in any one of a number of manners, examples of which are described below. The first side panel 80 preferably has apertures 234 through which threaded fasteners, such as fasteners 185, may extend to thread into mating passages 235 (FIG. 4) in laterally disposed surfaces of the front panel 9 and the back or rear panel 188 to secure the first side panel to the front and back panels.

Figure 6:
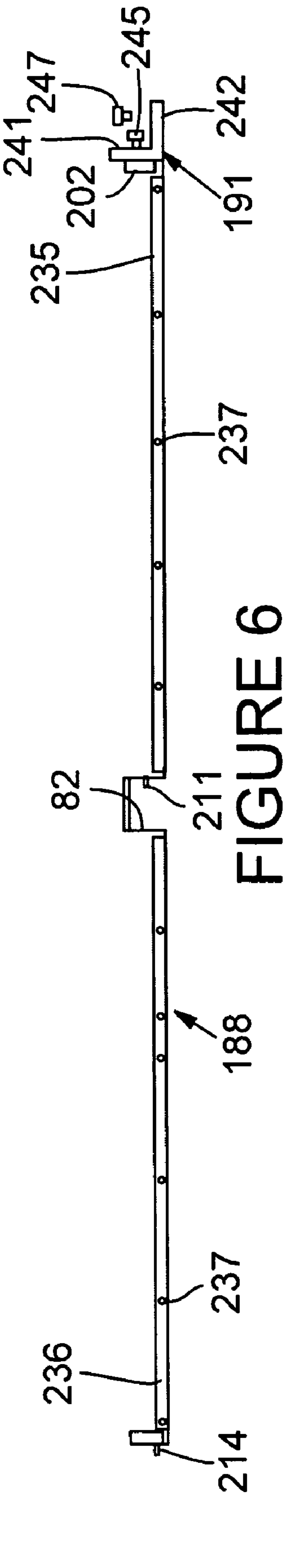
FIGS. 6 and 7 are a side view and a plan view of a back panel of the housing of the apparatus of FIG. 1.
Figure 7:
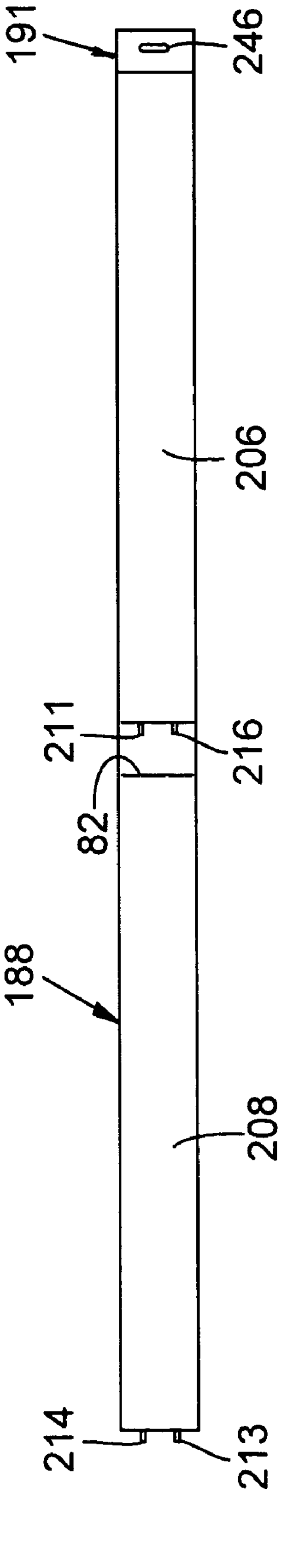
Figure 8:
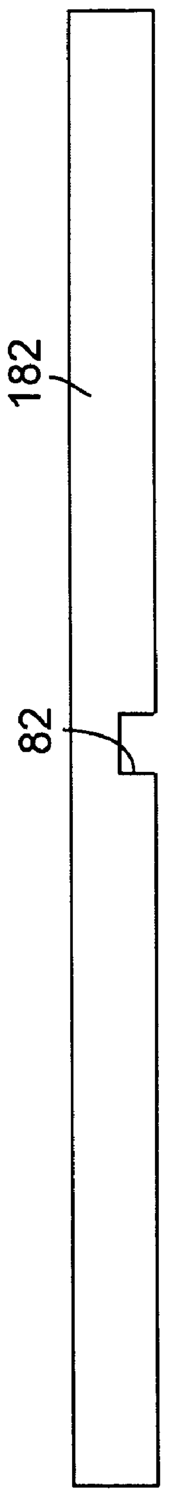
FIG. 8 is an elevational view of the remaining side wall of the housing of the apparatus of FIG. 1.

As shown in side view in FIG. 6, the back panel 188 includes first and second flanges 235, 236 extending perpendicularly from the first and second rear surfaces 206, 208, respectively, of the back panel. Similar flanges (not shown) extend perpendicularly from the first and second rear surfaces 206, 208, respectively, of the back panel at edges of the back panel that are transversely opposite the edges from which the first and second flanges 235, 236 extend. The flanges of the back panel, including the first and second flanges 235, 236, preferably include threaded apertures 237 in registration with the apertures 233 (FIG. 5) to receive fasteners, such as fasteners 185. Other well-known means may be used for receiving fasteners such as self-fitting nuts. The second side panel 182 (FIG. 8) may be secured to the back panel 188 in the same manner.

In an exemplary embodiment, the end mounting bracket 191 has first and second legs 241, 242 which are preferably perpendicular to each other. The first leg 241 is mounted to the first outer transverse surfaces 202 of the back panel 188 by fasteners 245. The second leg 242 has an aperture 246 (See FIG. 7) which may receive a fastener 247 for mounting in a rack unit.

Figure 9:
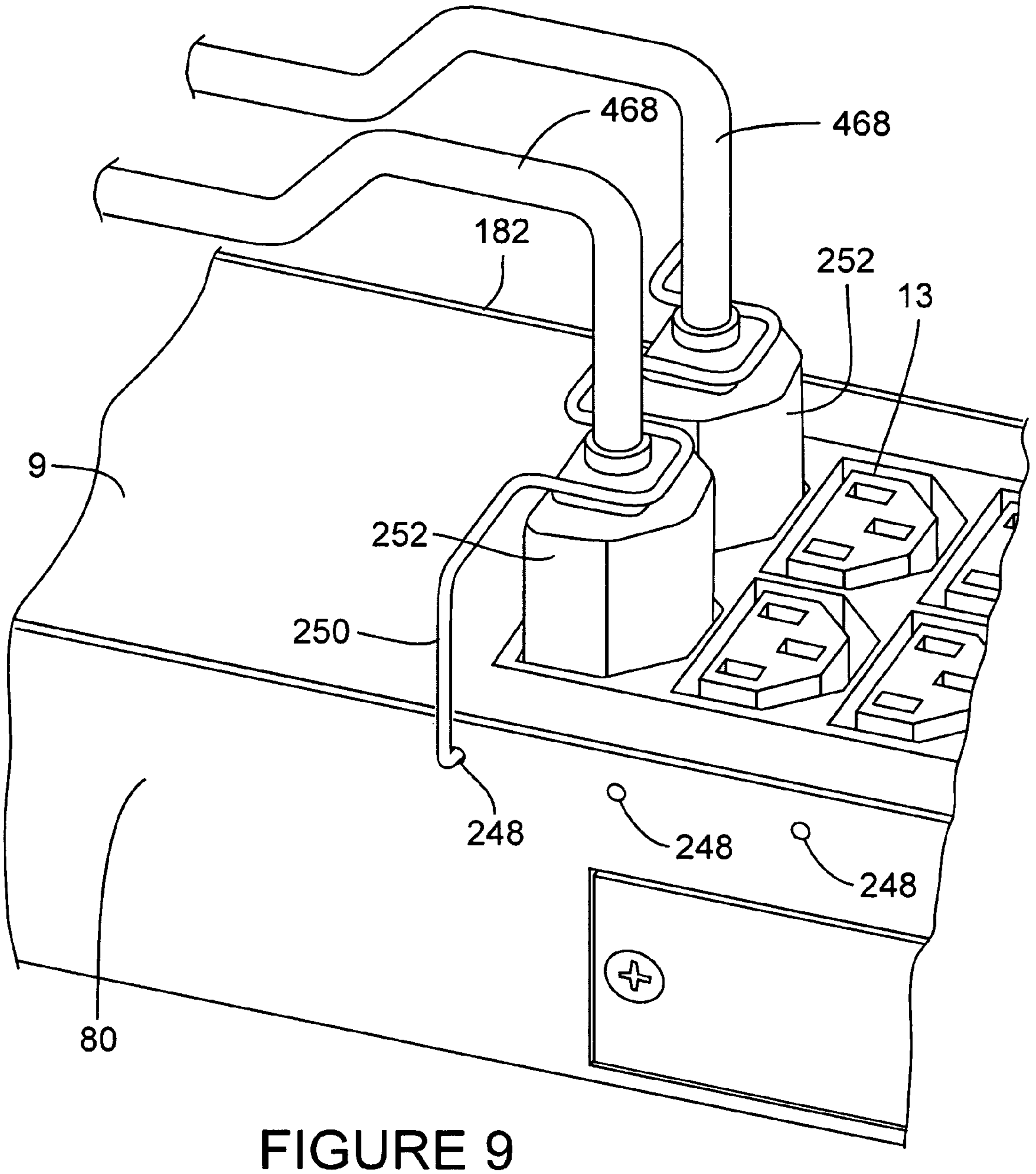
FIG. 9 is a partial detailed axonometric view of an embodiment including a device for holding power plugs in engagement with the apparatus of FIG. 1.

As shown in FIG. 9, according to one exemplary embodiment, additional apertures 248 may penetrate the first and second side walls 80, 182, respectively, at a forward side of the side walls to receive opposite ends of a plug retainer 250 configured to hold AC plugs 252 in engagement with receptacles 13. In the illustrated embodiments, plug retainer 250 is a wire with sufficient stiffness to hold a plug 252 in place when opposite ends of the retainer are secured in one aperture 248 in the first side wall 80 and a second aperture (not shown) in the second side wall 182. The wire should have sufficient flexibility to respond to manual force to be pushed onto or off of an end of the plug 252 remote from the front panel 9 and provide a press fit.

Figure 10:
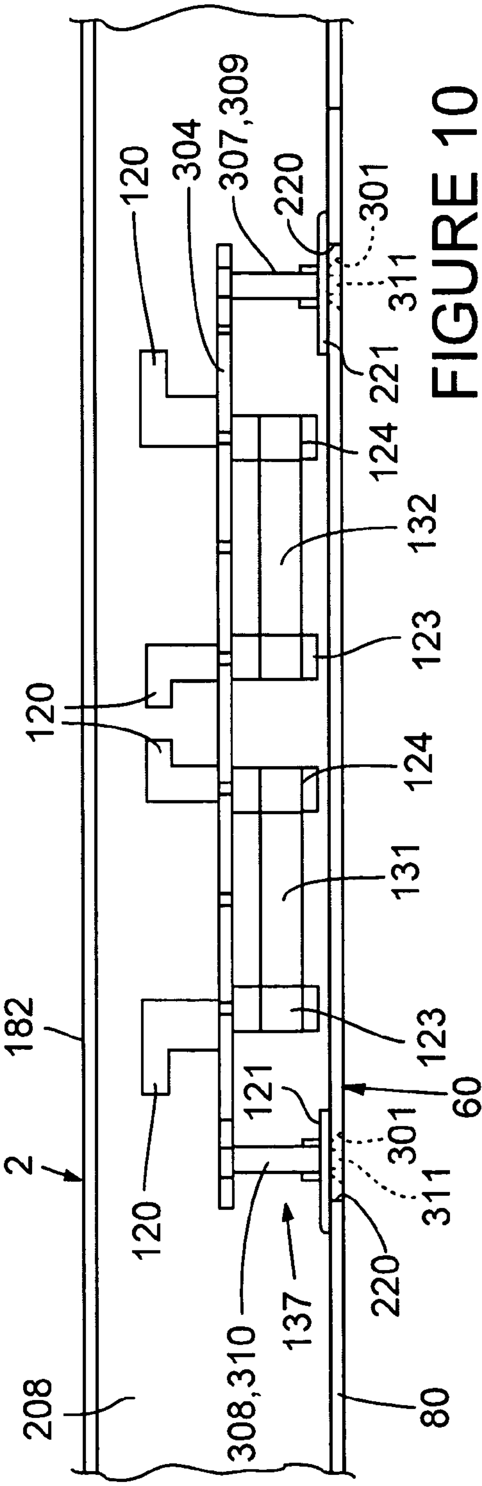
FIGS. 10 and 11 are a partial plan view with the front panel removed and a partial elevational view of one exemplary embodiment of a fuse assembly included in the apparatus of FIG. 1.
Figure 11:
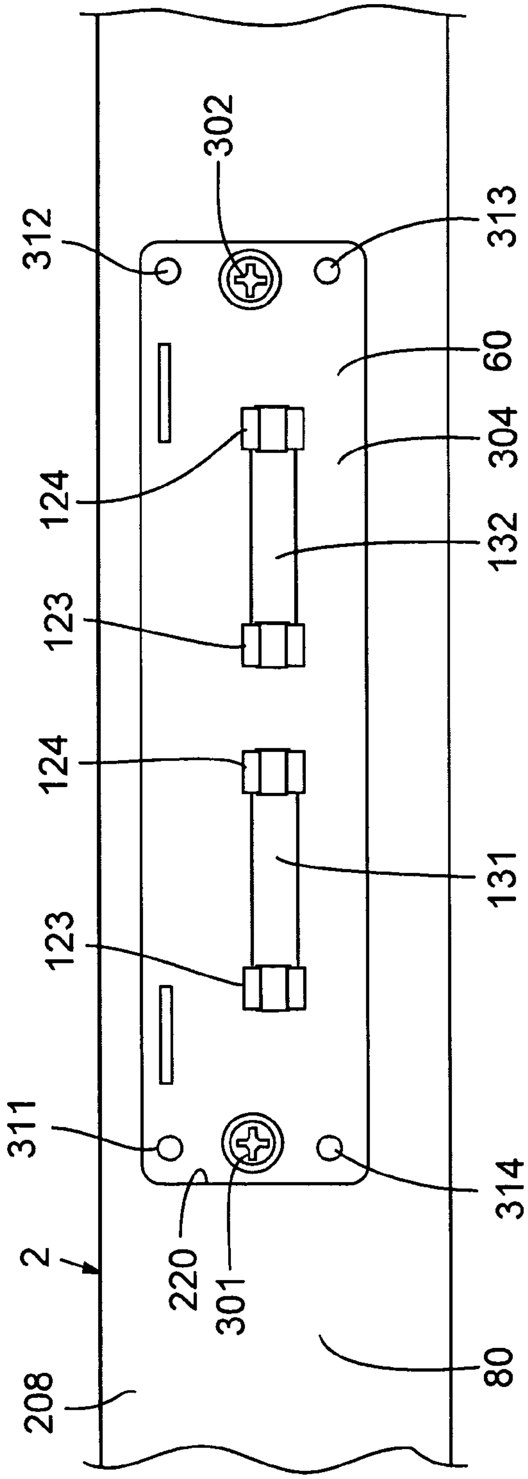

With reference now to FIGS. 10 and 11, the first window 60 is exemplary of the first through sixth windows 60-70. Fuses 131 and 132 are located longitudinally side by side and laterally adjacent the first window 60 within the interior confines of the housing 2. Each of the first and second fuses 131, 132 is connected between one of the pairs of first and second fuse mount terminals 123, 124. Each pair of first and second fuse mount terminals 123, 124 is electrically connected to one of the phase input lines 120.

A volume or space within the housing 2 in which the fuses 131, 132 are disposed when coupled to the first and second fuse mount terminals 123, 124 is referred to herein as a fuse compartment 137. Fuse compartments, e.g., fuse compartment 137, can be in registration, or aligned, with the first through sixth windows 60-70 respectively. In the present embodiment, the exemplary fuse compartment 137 is accessible by removal of a window, e.g., window 60, without disassembly of the housing 2. The fuse compartments of the PDU 1 may be segregated from other areas within the housing 1. For example, in some implementations, the housing can include walls (not shown) that isolate the fuse compartment from the remainder of the interior volume of the housing 2. Therefore, a manufacturer could permit a user to open up only that portion of the PDU 1 necessary to reach one of the fuses, e.g., 131, 132, while not having to void a warranty for opening up the rest of the housing 2. Specific examples of means of fastening the windows 60-70 are illustrated below.

The pairs of first and second fuse mount terminals 123, 124 and first and second fuses 131, 132 are mounted to a circuit board, such as circuit board 304. The PDU 1 can include first through sixth circuit boards, e.g., circuit board 304, each disposed within a respective fuse compartment, e.g., fuse compartment 137.

The housing 2 may be constructed so that the windows 60-70 are removable with simple hand tools. The windows 60-70, including the respective apertures 220-230 to which the windows are mounted, may be dimensioned for easy access to fuses such as the first and second fuses 131, 132. Easy access may comprise access by fingers of a user or by hand tools.

As described above, the fuses, such as fuses 131, 132, are visible through the windows, such as window 60, which are mounted to the housing. Window 60 is received and mounted in aperture 220. The aperture 220 can be recessed so that the window 60 is substantially flush with the first side panel 80. The first window 60 is retained to the first side wall 80 and within the aperture 220 by first and second fasteners 301, 302, which may comprise screws.

In some embodiments, as shown in FIGS. 10 and 11, the circuit board 304 is mounted to the window 60 for convenience. For example, at each corner of the circuit board 304 one of first though fourth standoffs 307, 308, 309, 310 maintain the circuit board 304 at a preselected transverse displacement from the window 60. First through fourth standoff fasteners 311, 312, 313, 314 pass through the window 60 and respective standoffs 307, 308, 309, 310 and are retained in the circuit board 304. In other embodiments, the circuit board 304 could be mounted to the housing 2 if desired.

Figure 12:
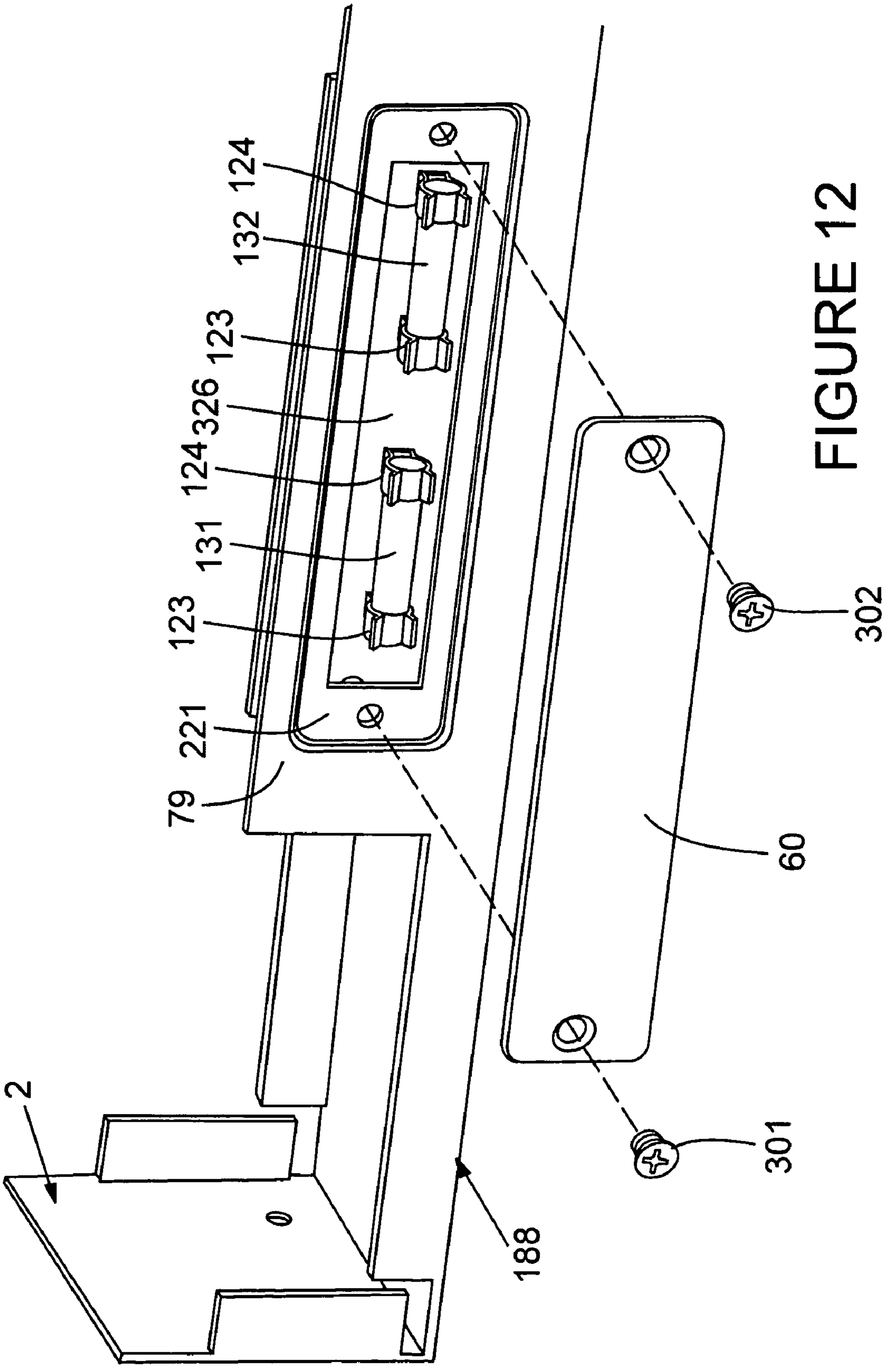
FIG. 12 is an exploded partial perspective view showing another embodiment of a fuse assembly.
Figure 13:
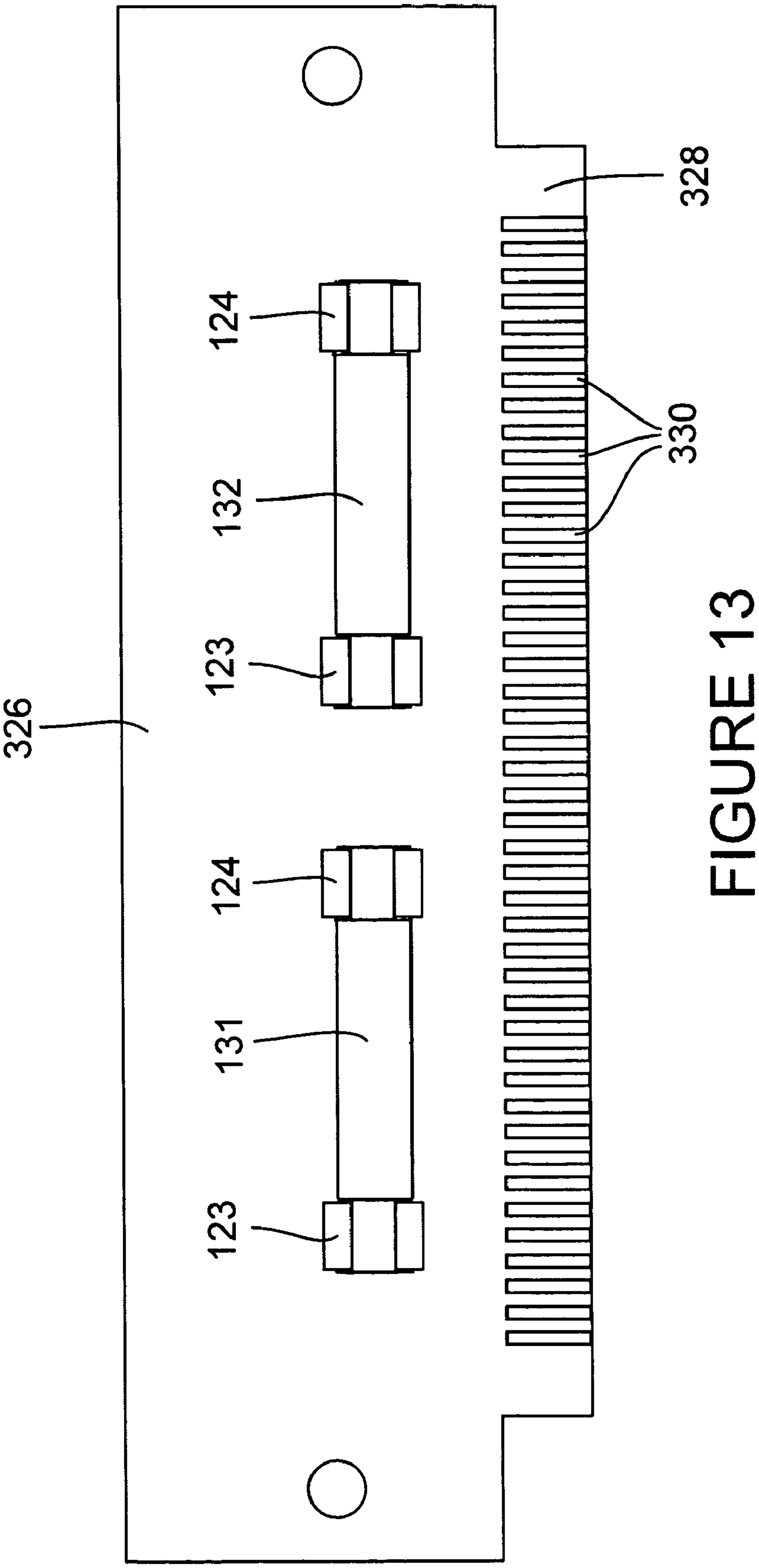
FIG. 13 is an elevational view of a removable fuse card of the fuse assembly shown in FIG. 12.
Figure 14:
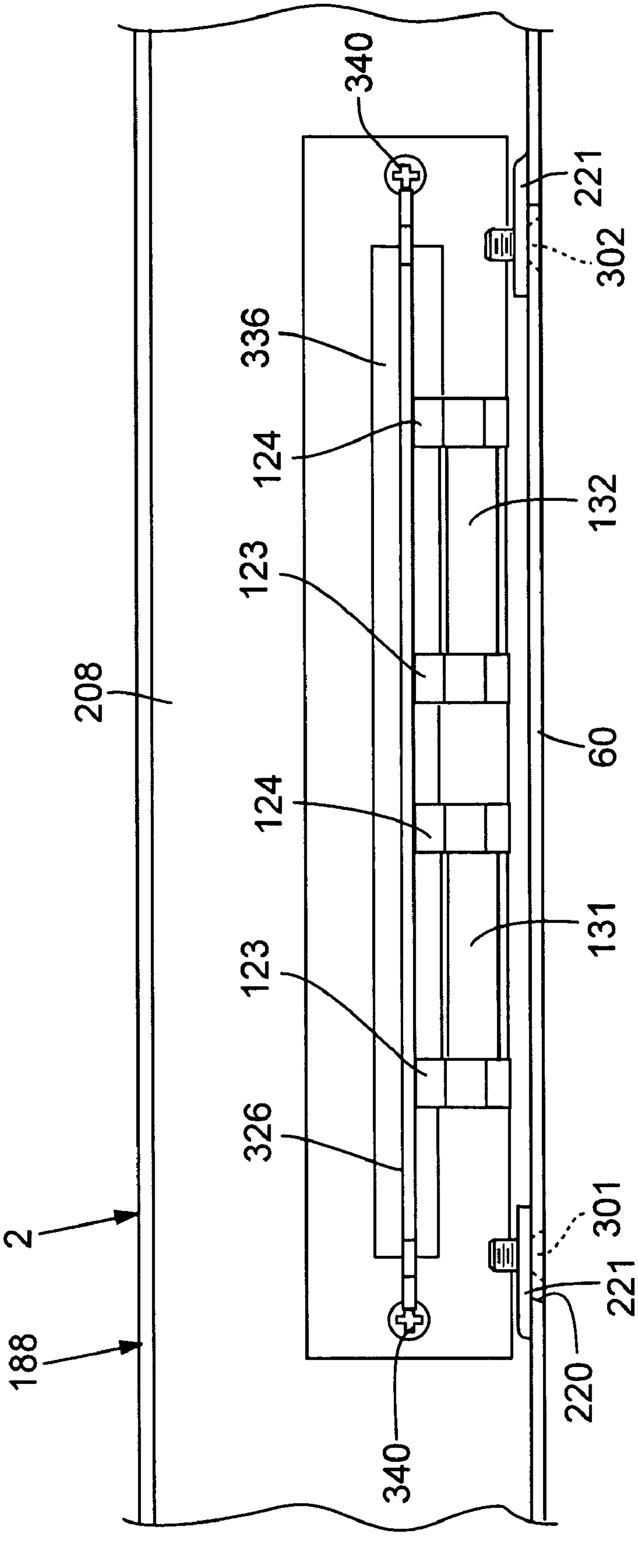
FIG. 14 is a plan view of the removable fuse card of FIG. 13 mounted within the housing shown in FIG. 12 with the front panel removed.

Referring now to FIGS. 12-14, an alternative embodiment of a PDU having housing 2 is shown. As perhaps best shown in FIG. 12, in some embodiments, the window receiving apertures, such as aperture 220, can include a recessed or stepped portion 221 to facilitate mounting of a window within the aperture 220 such that the window is substantially flush with an outer surface of the housing 2, which in this embodiment is the outer surface of a flanged portion 79 of the back panel 188.

As perhaps best shown in FIG. 13, in one specific embodiment, the printed circuit board can be a fuse card 326 that includes a tab 328 having copper tab terminals 330. The pairs of first and second fuse mounting terminals 123, 124 coupled to each fuse 131, 132 are each coupled to at least one of the tab terminals 330 of fuse card 326. Referring to FIG. 14, the tab 328 is received in a conventional card connector 336 providing mechanical support for the fuse card 326 and providing the series connection of each of the fuses 131, 132 in one of the lines 120 (not shown). The tab terminals 330 and card connector 336 are wired in a well-known manner to provide the above-described series connections of the fuses 131, 132 in series between the first supply terminal block 101 (FIG. 2) and the first and second receptacle banks 10, 12 respectively. The card connector 336 is supported directly or indirectly to the housing 2. In the present example, for simplicity in illustration, the card connector 336 is supported to an inner side of the second rear surface 208 of the back panel 188 (FIG. 3) by fasteners 340. In some implementations, the connector 336 can be mounted to and supported by the front panel 9 (FIG. 1) or first side panel 80 (FIG. 1).

Referring to FIGS. 15-18, other embodiments of a fuse assembly having fuse state indicators are shown. A fuse state indicator is an indicator device whose state corresponds to whether a fuse is conductive or blown.

Figure 16:
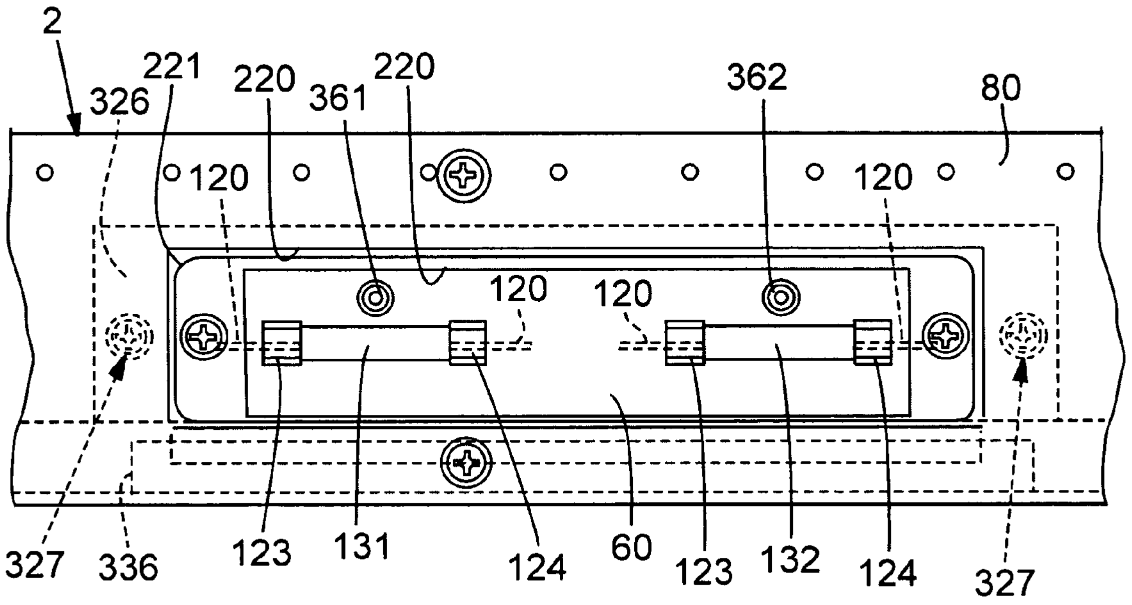
FIG. 16 is an elevational view of the fuse assembly embodiment shown in FIG. 15.

In the embodiment shown in FIGS. 15 and 16, the fuse state indicators each comprise light emitting diodes (LEDs) 361, 362 each electrically connected to one of the fuses 131, 132, respectively, and visible through the window 60. The window 60 is mounted to the side panel 80 of the housing 2 by fasteners 301, 302. The fuses 131, 132 are visible through the window 60 mounted within aperture 220 formed in the side panel 80. Similar to the embodiments described above in relation to FIGS. 12-13, the fuse assembly can include a fuse card 326 coupled to a card connector 336, both shown in hidden lines. The fuse card 326, or other type of printed circuit board, can also be coupled to the side panel 80 in spaced apart relation by a fastener/stand-off combination 327 also shown in hidden lines.

Figure 17:
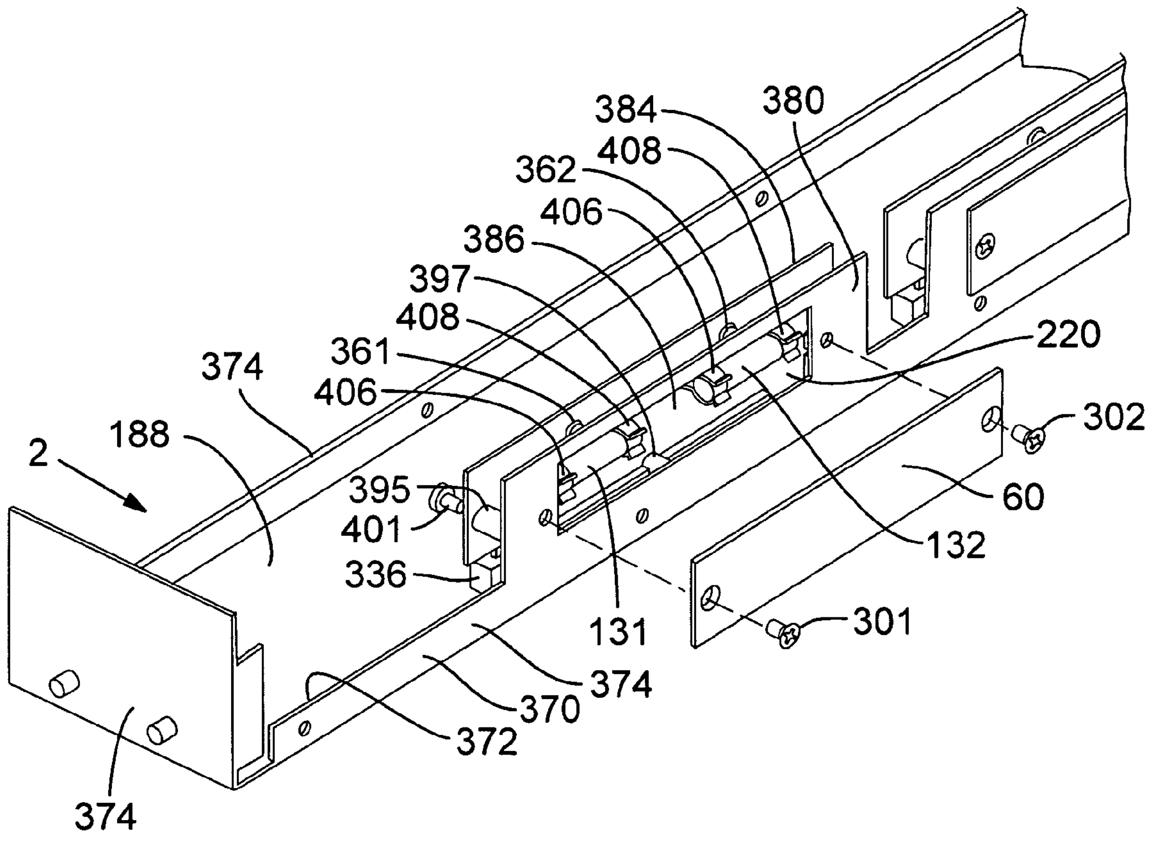
FIG. 17 is an exploded perspective view of another embodiment of a fuse assembly in which an element changes state to indicate fuse conditions.
Figure 18:
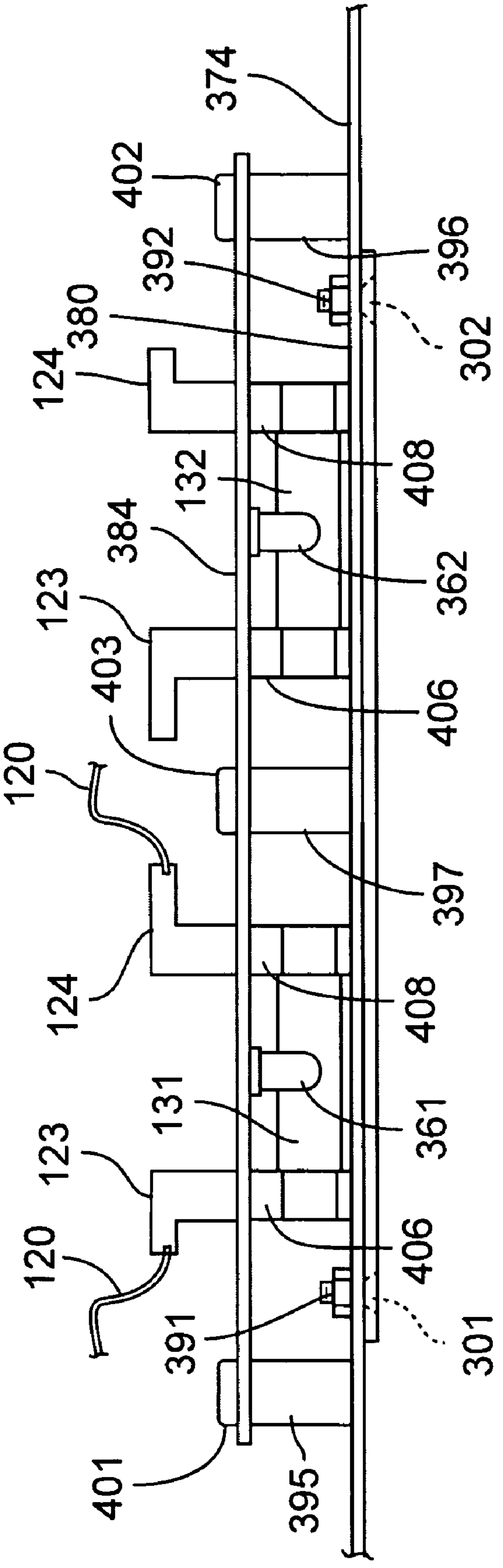
FIG. 18 is a plan view of the fuse assembly embodiment shown in FIG. 17.

Referring now to the embodiment shown in FIGS. 17 and 18, a fuse assembly is shown mounted to the back panel 188 of housing 2. The back panel 188 in this embodiment comprises an additional component, e.g., face plate 370, for mounting the window 60. The face plate 370 can be used irrespective of the type of fuse state indicator that is being employed. The face plate 370 has a back surface 372 in registration with the back panel 188 and flanges 374 that extend perpendicularly, i.e., transversely, from the lateral and longitudinal edges of the back panel. Additionally, a plurality of rectangular members, such as rectangular member 380, projects from the flange 374 and each include a respective fuse aperture, such as aperture 220. Each rectangular member may have a greater longitudinal extent than the apertures and windows of which they are associated. The window 60 may be fastened to the rectangular member 380 with fasteners 301, 302. A circuit board 384 may be separately fastened to the first rectangular member 380 of the face plate 370. The rectangular member 380 has a central cutout 386 so that fuses 131, 132 on the circuit board 384 are accessible therethrough for replacement.

With reference to FIG. 18, the fasteners 301, 302 are received in nuts 391, 392, which are on an opposite side of the face plate 374 from the window 60. Preferably, the nuts 391, 392 are adhered to the face plate 374. As shown, circuit board 384 is displaced from the faceplate 374 by first and second standoffs 395, 396 on opposite longitudinal sides of the window 60 (opposite left and right sides as viewed in FIGS. 17 and 18) and a third faceplate standoff 397 longitudinally intermediate the faceplate standoffs 395, 396 and laterally displaced therefrom. The faceplate standoffs 395, 396, 397 may be glued to the faceplate 374 or otherwise fastened thereto. First, second and third standoff screws 401, 402, 403 may secure the circuit board 384 to the standoffs 395, 396, 397, respectively. The fuses 131, 132 are respectively received in first and second fuse cartridge holders 406, 408, respectively. The first and second fuse cartridge holders 406, 408 extend through the circuit board 384 to connect to separate pairs of first and second terminal lugs, e.g., lugs 123, 124, which in turn are electrically coupled to power lines 120.

The indicator LEDs 361, 362 are mounted adjacent the fuses 131, 132 respectively. Each LED 361, 362 is in the OFF state when its corresponding fuse is blown and in the ON state when the fuse is conducting. In order to provide this operation, the indicator LEDs 361, 362 may be connected from the load side of the fuses 131, 132, respectively, to the source side of the fuses 132, 131, respectively, so as to be energized when the fuse is conducting and to be deenergized when the fuse comprises an open circuit. The LEDs 361, 362 are mounted in a conventional manner so the leads (not shown) extend from an opposite side of the circuit board 384 from which the LEDs 361, 362 are visible for connection to circuitry further described below. Other connections could be provided to achieve this operation. Indicator elements other than LEDs could also be used.

Figure 19:
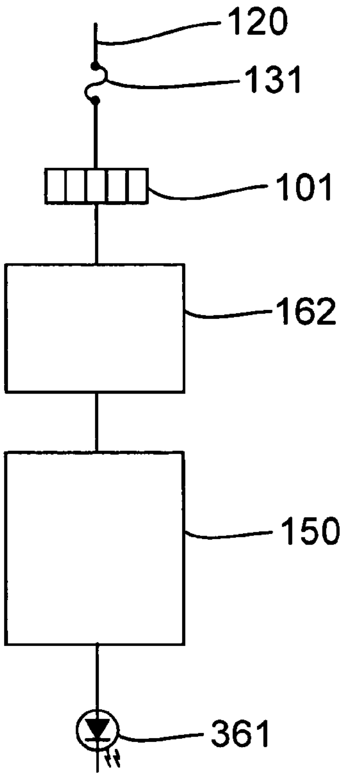
FIG. 19 is a schematic diagram of a fuse condition indication circuit that can be used in selected embodiments.

FIG. 19 is a schematic diagram of the fuse condition indication circuit that may be used in select embodiments. In FIG. 19, the same reference numerals are used to denote elements corresponding to those in FIG. 2. The fuses, e.g., fuse 131, is connected to the first bank supply terminal block 101. A voltage sensor module 162 is connected to the first bank supply terminal block 101 to sense continuity in the power line 120. This sensing of an open circuit is done in the same manner as in the above-cited Dual-Feed Power Tower XL system. In the present embodiment, the IT-DSP module is used to sense whether each of the lines 120 including the fuse 131 are closed between the first and second outlet banks 10 or 12 (not shown) and the first bank supply terminal block 101. If the circuit is open, the voltage sensor module 162 provides a signal indicative thereof to the control circuit 150. The control circuit 150 sends an activation signal to illuminate the LED 361 if the fuse 131 is blown or an activation signal to the LED 362 if the fuse 132 is blown. Otherwise, the LEDs 361 and 362 remain off. The state of the LEDs 361 and 362 is visible through the window 60.

FIG. 20 is a perspective view of the electrical apparatus 1 of FIG. 1 mounted in a rack 430. FIG. 21 is a partial detailed view of FIG. 20. FIG. 22 is a partial detailed view FIG. 20 illustrating the electrical apparatus 1 as viewed in the rack apparatus when facing the back panel 188 of the housing 2. The same reference numerals are used to denote elements appearing, for example, in FIGS. 1-9.

With reference now to FIGS. 20-22, the rack 430 is RETMA rack having a front side 484, first and second opposite sides 436, 437 extending transversely from the front side, and a back side 440 parallel to and opposite the front side. Channel-shaped horizontally disposed first and second bracing members 445, 446 are located at a vertical midpoint of the first and second sides 436, 437, respectively, of the rack 430. The first and second bracing members 445, 446 preferably define vertical cross sections having a rectangular envelope. Preferably, the PDU 1 is vertically aligned with the rack 430.

In other words, a longitudinal major dimension of the housing 2 of PDU 1 aligns with a vertical major dimension of the rack 430. The first and second bracing members 445, 446 have first and second horizontally extending support surfaces 438, 439, respectively, which may comprise flanges. The first and second support surfaces 438, 439 each have locating apertures 441 (see FIGS. 21 and 22). The locating apertures 441 may receive the locating pins 210, 211 (see FIG. 22).

A pair of opposing first front and back vertically extending rack rails 448 and a pair of opposing second front and back vertically extending rack rails 449 opposite the pair of first rack rails are located adjacent the sides 436, 437, respectively. In the present embodiment, the first and second vertically extending rack rails 448, 449 support the first and second horizontally disposed bracing members 445, 446 and are further secured to first and second upper housing members 452, 453. The first and second upper housing members 452, 453 are substantially parallel to the first and second bracing members 445, 446 and disposed at the upper vertical extent of the rack 430. The first and second vertically extending rack rails 448, 449 are also further secured to first and second lower housing members 454, 455, which are substantially parallel to the first and second bracing members 445, 446 and disposed at the lower vertical extent of the rack 430. The first and second lower housing members 454, 455 may each contain a surface having apertures for receiving the locator pins 213, 214 (not shown) extending from the longitudinally proximal end of the housing 2.

Figure 23:
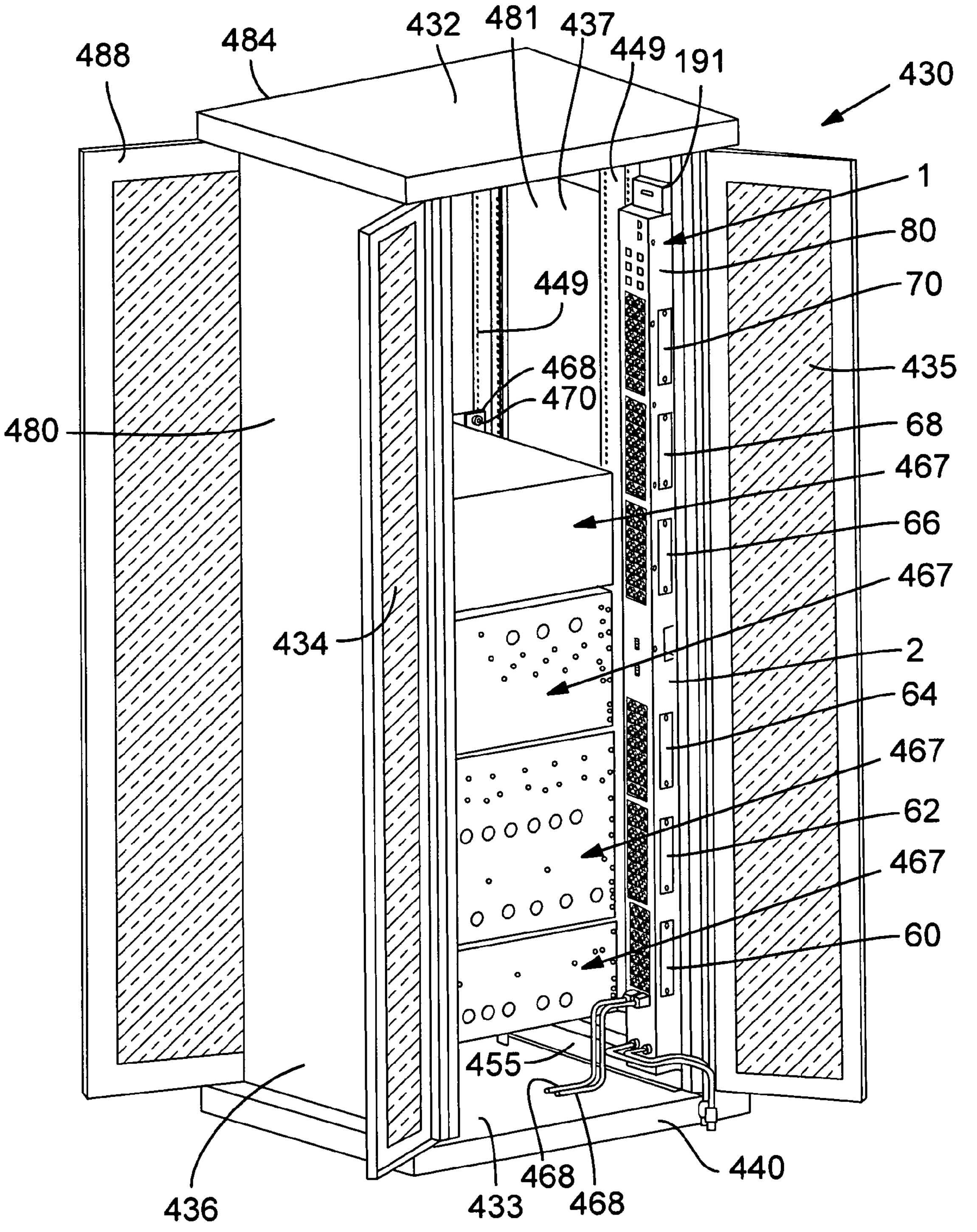
FIG. 23 is a perspective view of the apparatus of FIG. 1 mounted within the confines of an electronic equipment rack having doors providing access to the apparatus and other components mountable in the rack.
Figure 26:
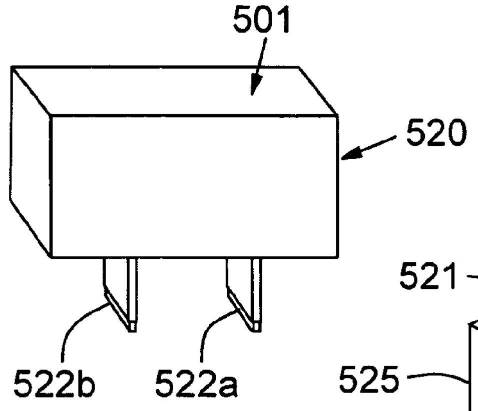
FIG. 26 is a perspective view of an exemplary fuse carrier of one of the modules shown in FIG. 24.

The rack 430 is a standard component, and the first and second vertically extending rails 448, 449 when mounted as described are spaced form each other to support standard size rack mounted equipment units 467 powered by power cords 468 (see FIGS. 9 and 23). The first and second rack rails 448, 449 also have fastener-receiving openings 464. Commonly, as shown in FIG. 23, rack mounted units 467 will have rack fastener passages 468, such as notches or apertures. Rack equipment fasteners 470, such as screws secured by nuts, extend through the passages 468 to secure the various rack mounted units 467 to the first and second rack rails 448, 449.

The rack fastener passages 468 are preferably spaced to accommodate standardized unit heights. Unit height is standardized in multiples, referred to as 1U, 2U, etc., of a standard height dimension U (1.75 inches).

In order to provide for convenient access for users of the rack 430 to plugs 252, the PDU 1 is placed between the first and second rack rails 448, 449 and the back side 440. In the present example, the housing 2 is vertically disposed with the back panel 188 facing the second side 437. As perhaps best shown in FIGS. 21 and 22, in order to better fit in the rack 430, the rack mating section 81 cooperates with the second bracing member 446. The second bracing member 446 fits in the contour 82 (FIG. 1) of the rack mating section 81. First and second locating pins 211 and 212 extending vertically downwardly from the first inner lateral surface 196 (FIG. 3) are received in apertures 441 to locate the housing 2 on the second bracing member 446 adjacent the back vertically extending rack rail 449. The second bracing member 446 provides vertical support to the housing 2. The pins 213, 214 at the second outer lateral surface 204 of the housing 2 (FIG. 3) are received in the apertures (not shown) of the second lower housing member 455. The second lower housing member 455 may also share weight applied in the vertical direction from the housing 2. It is possible to change the spacing of the surfaces of the second bracing member 446 and second lower housing member 455 to vary distribution of the weight of the housing 2.

Normally both the second bracing member 446 and second lower housing member 455 will provide support. Alternatively, or in addition, the end mounting bracket 191 (FIG. 1) may be secured to the second upper housing member 453 by the fastener 247 (FIG. 6).

The housing 2 is mounted so that the windows 60-70 remain visible from the rear or back of the rack. Therefore, the fuses 131-136 can always be inspected to determine each of their states. Since the windows 60-70 remain accessible, they can be removed without removing the housing 2 from the rack 430 and without disassembly of the housing 2. Therefore, any downtime due to the need to replace a fuse is minimized.

FIG. 23 is a perspective illustration similar to FIG. 20 in which the same reference numerals are used to denote corresponding components. However, the rack 430 shown in FIG. 23 has first and second side walls 480, 481 outside of vertically extending rails 448, 449, and first and second bracing members 445, 446. The rear front side 484 of the rack 430 may be closed by a first front door 488 and a corresponding second front door (not shown) pivotably mounted to sides 480 and 481, respectively, proximate the front of the rack. Similarly, a rear side 440 of the rack 430 may be closed by first and second rear doors 434, 435 pivotably mounted to sides 480, 481, respectively, proximate the rear of the rack. Further rack mounted equipment units 467 may be mounted to the first and second rack rails 448, 449 (FIG. 20). Power cords 468 may be conveniently plugged in the housing 2.

In accordance with the above teachings, fuses are provided in a readily accessible position. More specifically, the housing 2 of the PDU 1 is configured so that when it is mounted in an apparatus, such as an electrical equipment rack, the fuses can be accessed by removing just the covers, e.g., the windows 60, without having to remove the entire housing 2 from the apparatus. In the embodiments illustrated in FIGS. 20-23, the windows 60 are mounted in the side wall 80 (FIG. 1), and the housing 2 is mounted on the left side, or side 437, of rack 430 as seen in FIGS. 20 and 23. Alternatively, in some embodiments, the windows 60-70 could be included in side wall 182 illustrated in FIG. 3 and the housing 2 could be mounted on the right side, or side 436, of the rack 430. Windows 60-70 mounted in the side wall 182 would be unobstructed when the housing 2 is mounted on the left side of the rack 430. The housing 2 may be constructed in either configuration.

Fused circuitry may be isolated from the fuses themselves so that a user may be permitted to open a fuse compartment without having to open a circuit enclosure, which might void a warranty.

Further, the state of the fuses may be inspected without having to remove fuse covers or open a fuse compartment. For example, a fuse may be inspected through a transparent window. Alternatively, a fuse state indicator element may be provided having first and second states each corresponding to a conductive or nonconductive state of the fuse. Different fuse-carrying structures are provided, each of which allows for simplicity and convenience in replacing fuses. Fingers or simple hand tools may be used. Indicators are provided which may interact with existing intelligent power control circuitry.

Alternatively, circuit breakers (not shown) may be provided. Such circuit breakers could be mounted within the side wall 182 of the housing 2 so that they can be readily observed or reset by a user without opening the housing 2.

In the embodiment of FIG. 20, the housing 2 is readily mountable within the confines of a rack so that the fuse covers or windows are readily accessible. Consequently, down time resulting from inspecting or replacing fuses is minimized. When a communications server is down, saving even a few minutes in completing service is of great value to users. The construction of the detent allows a single service technician to have the PDU remain in place while fasteners are being inserted to secure the PDU to the rack.

Many modifications may be made in the specific teachings provided above to provide an electrical apparatus constructed in accordance with the above disclosure.

For example, described hereinafter are embodiments of a fuse module for use with a fused electrical apparatus. The fuse module includes a removably attachable fuse carrier that protects and houses, holds, or otherwise carries, a fusse for use with the fused electrical apparatus. The fuse carrier is easily attached, or otherwise coupled, to the module to electrically couple a fuse carried by the carrier to the fused electrical apparatus and easily detached, or otherwise decoupled, from the module to electrically decouple the fuse from the apparatus. As used herein, the term "removably attachable" is defined to mean easily removable or easily detachable from an object, and easily attachable to an object, without violence to the carrier or the object such that the carrier and the object remain functional.

In the illustrated embodiments, for example, the fused electrical device is a power distribution unit, such as the power distribution unit described above in relation to FIGS. 1-23. However, in other embodiments, the fused electrical device can be any of various other types of electrical devices employing a fuse, such as, for example, radios, televisions, computers and appliances.

Referring to FIG. 24, and according to one illustrative embodiment, a plurality of fuse modules 500*a*-500*f* are shown mounted to a power distribution unit (PDU) 502. The PDU 502 is similar to PDU 1 described above except that PDU 502 is adapted to receive a single power input, instead of two power inputs. Further, like PDU 1, PDU 502 has multiple columns of vertically arranged power receptacle banks. However, the receptacle bank columns of PDU 502 in this example are not horizontally or laterally adjacent each other as in PDU 1, but are rather just vertically aligned relative to each other.

PDU 502 can include a housing 504, a power input 506, which in this example is for a three-phase application, and a plurality of power receptacles, or outlets, 510. The plurality of receptacles 510 can be organized into first and second receptacle banks 508*a*, 508*b*, third and fourth receptacle banks 508*c*, 508*d*, and fifth and sixth receptacle banks 508*e*, 508*f*, each comprising a single column of multiple outlets 510 interconnected with each other. The first and second receptacle banks 508*a*, 508*b* can be electrically connectable to a first phase of the three phase power input 506, the third and fourth receptacle banks 508*c*, 508*d* can be electrically connectable to a second phase of the three phase power input, and the fifth and sixth receptacle banks 508*e*, 508*f* can be electrically connectable to a third phase of the three phase power input, such that each receptacle, or outlet, 510 provides single phase power to components plugged into the outlets. The banks can be mounted to and penetrate a front wall 511 of the housing 504.

Alternatively, in some embodiments, the fuse module of the present application can be adapted to be mounted to and be operable with a PDU having two three-phase power inputs and sets of horizontally adjacent receptacle banks, such as PDU 1 described above.

In other embodiments, the power distribution unit can be adapted to receive one or more single-phase power inputs connected to a single-phase alternating current source (not shown) for providing single phase power to one or more outlet banks.

Similar to the apertures, or passageways, 220-230 penetrating the first side wall 80 of PDU 1 described above, the power distribution unit housing 504 includes at least one fuse module passageway 513 penetrating a side wall 512 of the housing 504 and through which an interior of the housing can be accessed (see FIG. 25). However, instead of receiving a transparent window as in embodiments shown in FIGS. 1-23, the at least one fuse passageway 513 receives a fuse module, such as fuse module 500*a*.

Referring now to FIG. 25, fuse module 500*a*, being exemplary of fuse modules 500*b*, 500*c*, 500*d*, 500*e*, 500*f*, is at least partially mounted within the fuse access passage, or aperture, 513. As shown, in some implementations, the fuse access passage 513 can be generally rectangular shaped. The fuse module 500*a* includes a fuse carrier 501 and a mounting plate 514. The mounting plate 514 can have, for example, a generally rectangular shape and fit at least partially within or over the fuse access passage 513. In some implementations, the mounting plate has an outer perimeter just smaller than an outer perimeter of the passage 513 such that the mounting plate is matingly received within the passage. The mounting plate 514 can be secured to the housing 502 by a fastening mechanism, such as fasteners 518, and have a fuse carrier access opening 516 through which a fuse carrier, such as fuse carrier 501, can extend.

The fuse carrier of the present application is configured to house, i.e., support and at least partially enclose, a fuse for use in a fused electrical apparatus. Referring to FIGS. 26-29, an exemplary embodiment of one implementation of a fuse carrier is shown. As shown assembled in FIG. 26, the fuse carrier 501 includes, for example, a housing 520 supporting and enclosing a fuse, and a pair of power terminals 522*a*, 522*b* extending from the housing and electrically coupled to a fuse disposed within the fuse carrier housing.

Figure 27:
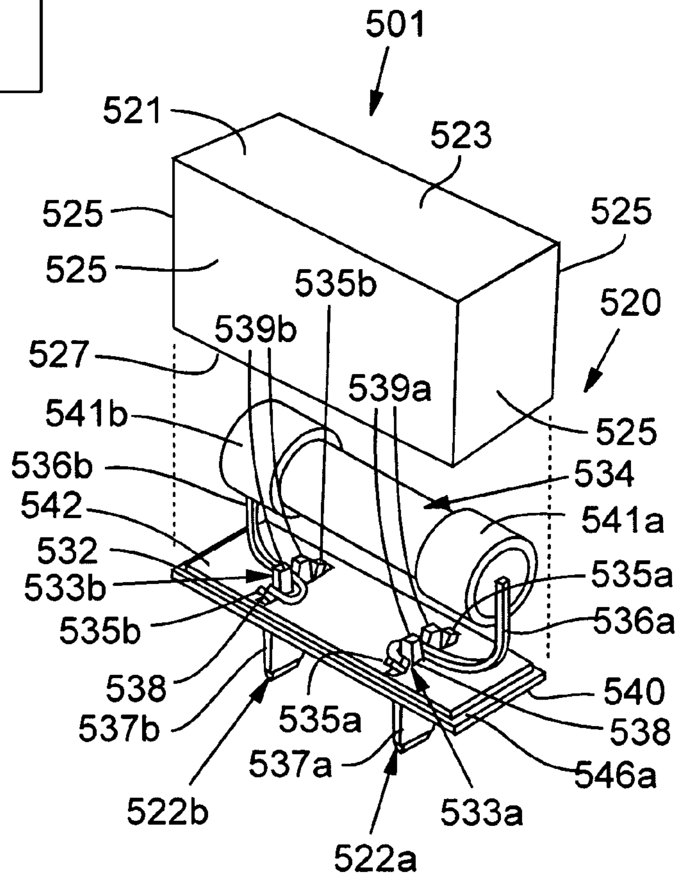
FIG. 27 is an exploded perspective view of the fuse carrier of FIG. 26.
Figure 28:
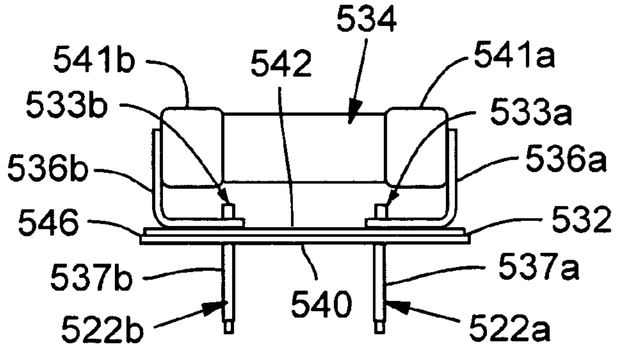
FIG. 28 is a frontal elevational view of the fuse carrier of FIG. 26 with a fuse carrier cover removed.

As shown in FIG. 27, in one exemplary implementation, the housing 520 includes a cover 521 coupled to a base 532. The cover 521 can comprise an at least partially enclosed shape, such as a generally rectangular box shape as shown, having an open side or face. The closed sides or surface of the cover 521 define a volume, cavity, space or hollow portion (not specifically shown) between the sides. In the exemplary embodiment, the cover 521 includes a planar closed end 523 and four generally planar sides 525 extending generally transversely or perpendicularly from the closed end and terminating at a generally rectangular-shaped open end 527 opposite the closed end. Two of such sides are parallel to, and extend perpendicularly from, the two other parallel sides. In this implementation, the cavity defined between the closed end 523 and the four sides 525 of the cover 521 has a generally rectangular prism shape.

The base 532 is configured to at least partially cover the open end 527 of the cover 521 such that when coupled to the base, a fuse is capable of being disposed in the area defined between the base and the cover, e.g., within the cavity of the cover. As shown, in certain implementations, the base 532 of the fuse carrier 501, when coupled to the cover 521, is configured to at least substantially cover the open end 527 of the cover. For example, in the illustrated implementations, the base 532 is a generally plate-like element having a generally rectangular-shaped outer perimeter corresponding to the rectangular shape of the open end 527 of the cover 521.

In some implementations, the base 532 can have, for example, a shelved, or lipped, portion 546 formed in the internal surface 542 of the base and extending around the perimeter of the base. In the illustrated implementations, the open end 527 matingly engages the shelved portion 546 of the base 532 such that the outer surfaces of the sides 525 of the cover are approximately flush with the outer perimeter of the base 532 when the cover is coupled to the base.

A cover, such as cover 521, can be coupled to a base, such as base 532, by any of various coupling techniques. For example, the edges of the cover 521 adjacent the cavity of the cover can be adhered to the base 532 by application of an adhesive between the cover and the base. Although not shown, it is recognized that in other implementations, the cover 521 can be coupled to the base 532 by any of various fastening mechanisms known in the art, such as a nut and bolt arrangement, mating snap-fit elements formed in the cover and base, or a hinged arrangement.

In the illustrated embodiments, the power terminals 522*a*, 522*b* are coupled to and extend from the base 532. The power terminals 522*a*, 522*b* are coupled to the base 532 at first end portions 533*a*, 533*b*, respectively, and extend transversely from an external surface 540 of the base, opposite an internal surface 542, in a direction away from the housing 520. The power terminals 522*a*, 522*b* include second end portions, or prongs, 537*a*, 537*b* generally opposite the first end portions 533*a*, 533*b*. The prongs 537*a*, 537*b* are configured to be received in an electrical power receptacle as will be described in more detail below. For example, as shown, the prongs 537*a*, 537*b* can be a generally rectangular-shaped plate-like element sized to extend through a generally rectangular shaped receptacle. In other implementations, the prongs can be shaped and sized to be received in receptacles having sockets with shapes and sizes corresponding to the shapes and sizes of the prongs.

To accommodate coupling the terminals 522*a*, 522*b* to the base 532, the base can include, for example, terminal passageways 538 penetrating the base. The first end portions 533*a*, 533*b* of each terminal 522*a*, 522*b*, respectively, extends through a respective passageway 538 and, in one exemplary implementation, can be secured to the base 532 in a snap-fit type arrangement. For example, as shown in FIG. 27, the first end portions 533*a*, 533*b* of terminals 522*a*, 522*b*, respectively, include respective resilient tabs 535*a*, 535*b* resiliently movable relative to each other. When in an unflexed state, the tables 535*a*, 535*b* are spaced apart from each other a distance greater than a major dimension of the passageway 538 formed in the base 532.

The terminals 522*a*, 522*b* can be coupled to the base by first applying an inwardly directed pressure to the respective tabs 535*a*, 535*b* to move the tabs toward each other. With the tabs 535*a*, 535*b* in this position, the first end portions 533*a*, 533*b* of the terminals 522*a*, 522*b*, respectively, can be extended up through a respective one of the passageways 538 in a direction from the outer surface 540 toward the internal surface 542 of the base 532 until at least a portion of the tabs 535*a*, 535*b* extend past the interior surface 542 of the base 532. With the terminals 522*a*, 522*b* in this position, the inwardly directed pressure applied to the tabs 535*a*, 535*b* can be removed to allow the tabs to move away from each other and at least partially contact the internal surface 542 of the base. Further, the prongs 537*a*, 537*b* can have a major dimension greater than the major dimension of the passageways 538. In this manner, the base 532 is disposed between the resilient tabs 535*a*, 525*b* and prongs 537*a*, 537*b* of terminals 522*a*, 522*b*, respectively, to effectively secure the terminals to the base.

In alternative embodiments, the terminals 522*a*, 522*b* can be coupled to the base 532 by any of various known connecting mechanisms or techniques. For example, in some implementations, the terminals can be connected to the base by soldering or through use of one or more fasteners or fastener assemblies.

Preferably, the terminals 522*a*, 522*b* are coupled to the base 532 such that at least a portion of the first end portions 533*a*, 533*b* of the respective terminals are at least partially exposed to the interior cavity of the housing. For example, as shown in FIG. 27, the first end portions 533*a*, 533*b* of the respective terminals 522*a*, 522*b* have spaced-apart fuse connector tabs 539*a*, 539*b*, respectively, disposed within the housing cavity. The tabs 539*a*, 539*b* can extend approximately transversely to the interior surface 542 of the base 532.

Figure 29:
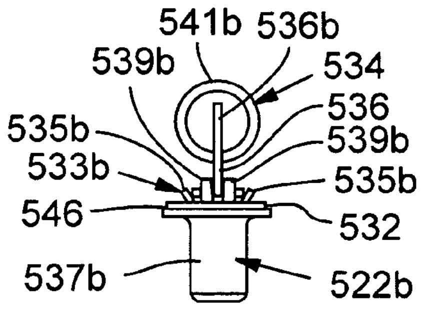
FIG. 29 is a side elevational view the fuse carrier of FIG. 26 with a fuse carrier cover removed.
Figure 30:
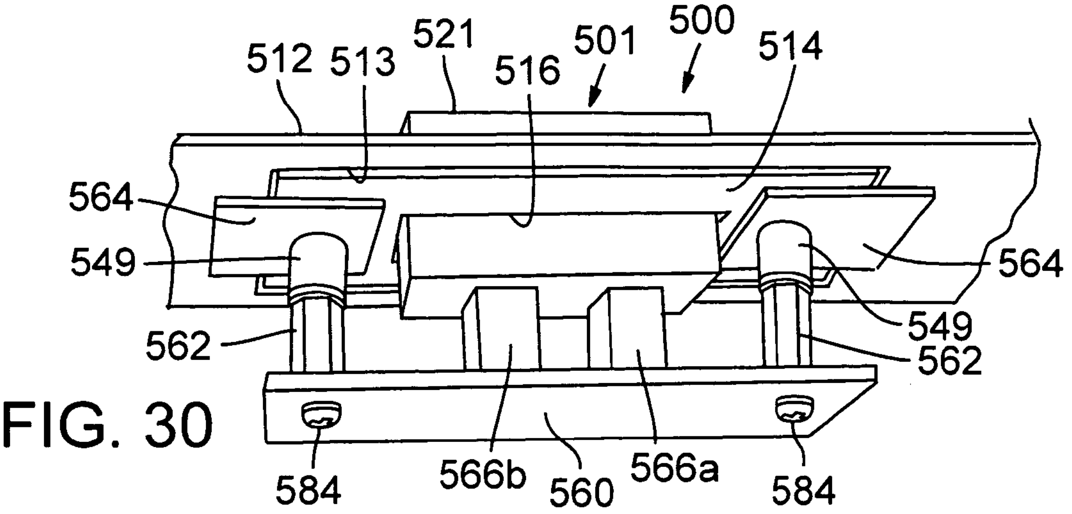
FIG. 30 is a perspective view of a fuse module mounted to the housing of a power distribution unit as viewed from within and below the fuse module.

Perhaps best shown in FIG. 29, the fuse connector tabs 539*a*, 539*b* are spaced-apart to receive a portion of respective electrically conductive fuse connectors, e.g., wires 536*a*, 536*b*, between and in contact with a corresponding tab. The wires 536*a*, 536*b* are electrically coupled to the terminals 522*a*, 522*b*, respectively, on one end and respective opposing conductive ends 541*a*, 541*b* of a fuse 534 on the opposite end.

Fuses as used herein can be any of various fuses known in the art. For example, in some embodiments, the fuse is capable of providing, or rated for, branch circuit protection in a power distribution system according to the National Electrical Code (NEC). In specific implementations, the fuse, such as fuse 534, can be a cartridge-type fuse, such as, for example, a Bussmann SC20 fuse or a Littlefuse SLC20 fuse. Further, although a fuse carrier housing a single fuse is shown, it is recognized that for some applications, a carrier can house two or more fuses.

In the illustrated embodiments, wires 536*a*, 536*b* are electrically coupled to terminals 522*a*, 522*b*, respectively. For example, the portion of the wires 536*a*, 536*b* between the tabs 539*a*, 539*b* can be soldered to the tabs. In other implementations, the fuse connectors can be electrically coupled to the terminals 522*a*, 522*b* through use of other known connecting mechanisms, such as conductive fasteners fastening a respective connector and terminal to each other.

The fuse connectors, e.g., wires 536*a*, 536*b*, can be at least partially rigid to secure the fuse 534 in place within the housing cavity and away from the terminals 522*a*, 522*b* for preventing inadvertent electrical contact between the fuse and the terminals. In some implementations, the connectors can be conductive plate-like elements or any other appropriate conductive partially rigid element.

It is also recognized that in some embodiments, a separately connectible fuse connector as described herein need not be used. For example, the electrically conductive fuse connectors can be formed integral with or as a one-piece monolithic construction with the terminals. More specifically, the terminals can be lugs or clips, such as first and second terminals 123, 124, as described above, each having two resiliently opposed prongs for receiving and removably containing a respective end of the fuse.

As described above, in the illustrated embodiments, terminal 522*a* is electrically coupled to conductive end 541*b* of fuse 534 via a fuse connector and terminal 522*b* is electrically coupled to conductive end 541*a* of the fuse via a fuse connector. In this manner, when the fuse 534 is conductive, i.e., not blown, the terminals 522*a*, 522*b* are electrically connectable via the fuse.

In assembly, the terminals 522*a*, 522*b*, fuse connectors, e.g., wires 536*a*, 536*b*, and fuse 534 can first be coupled to the base 542. The cover 524 is then placed over the fuse 534 and fuse connectors and coupled to the base 532 such that the fuse 534, wires 536*a*, 536*b* and first end portions 535*a*, 535*b* of the terminals 522*a*, 522*b*, respectively, are disposed within the housing cavity. Accordingly, when the cover 521 is coupled to the base 532 to form the housing 520, the base effectively seals the open end 527 of the cover such that the housing prevents damage to and inadvertent electrical contact with the fuse 534 by external objects.

In specific embodiments, the cover 521 of the fuse module 500*a* is at least partially opaque and in some implementations, can be black and substantially opaque. In such embodiments, a fuse condition indicator, such as described above, can be associated with the fuse module 500*a* to determine the condition of a fuse. In other specific embodiments, the cover 521 of the fuse module 500*a* is at least partially clear or transparent, such that the condition of the fuse can be determined by visual inspection in addition to or instead of a fuse condition indicator.

Referring now to FIGS. 30-33, the fuse modules, for example, fuse module 500, can include a printed circuit board 560 disposed within the housing 504 of the PDU 502. The housing 504 includes module mounting elements for facilitating mounting of the fuse module 500 to the housing. As perhaps best shown in FIGS. 30 and 32, the fuse module mounting elements can be, for example, a pair of tabs 564 each mounted, such as by spot welding, to an interior surface of the housing adjacent longitudinally opposite ends of the passageway 513. The tabs 564 comprise a plate-like element with each tab having an opening 547 penetrating the respective tab. The tabs 564 are positioned such that a portion of the tabs 564 including the opening 547 extends into the passageway 513. A threaded nut 549 can be mounted to an interior surface of each of the tabs in alignment with the openings 547.

In some embodiments, the mounting elements can be coupled to or formed as a monolithic one-piece construction with the power distribution unit housing 504. For example, the passageway 513 can include a recessed portion, similar to the recessed or stepped portion 221 of aperture 220 described above in relation to FIG. 12.

The mounting plate 514 of fuse module 500 includes openings (not shown) corresponding to and alignable with the openings 547 formed in the tabs 564. The mounting plate 514 can be disposed at least partially within the passageway 513 and secured to the mounting elements, such as tabs 564, by inserting fasteners, such fasteners 518, through the openings 547 in the mounting plate and mounting elements and threadably tightening the fasteners to the nuts 549.

Figure 31:
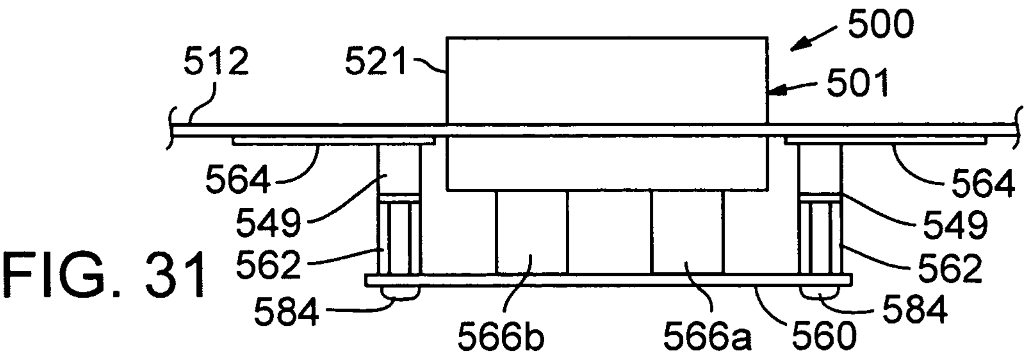
FIG. 31 is a side elevational view of the fuse module mounted to the housing of the power distribution unit as shown in FIG. 30.
Figure 32:
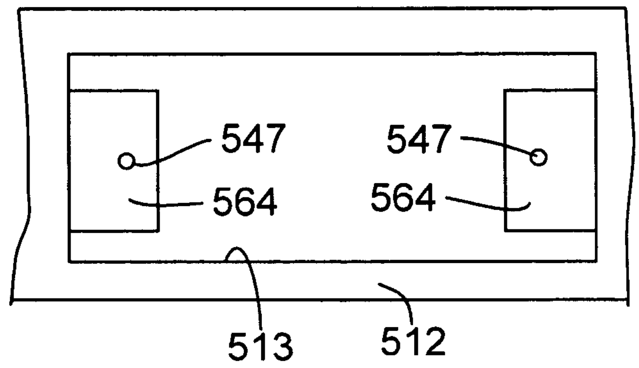
FIG. 32 is a plan view of a fuse access passage formed in a power distribution unit housing.

As perhaps best shown in FIGS. 25 and 31, in some implementations having mounting elements, such as tabs, when the mounting plate 514 is mounted to the housing 504, an external surface the plate can be substantially flush with an outer surface of the housing.

Although the illustrated embodiments shown the mounting plate 514 mounted within the passageway 513 through use of mounting elements, it is recognized that the mounting plate can be mounted over the passageway 513. Similar to the window 60 of FIGS. 17 and 18 described above, the mounting plate can be mounted over the passageway 513 using fasteners that extend through openings adjacent the passageway.

In exemplary embodiments, the printed circuit board 560 is mountable within the power distribution unit housing 504 adjacent the passageway 513 and extends generally parallel to side 512. In specific implementations, the printed circuit board 560 can be mounted to the housing 504 by fasteners 584 extending through openings in the printed circuit board and threadably engaging the housing or elements coupled to the housing, such as nuts 549. Preferably, in some implementations, the printed circuit board 560 is mounted such that the board is spaced-apart from the side wall 512. In the illustrated embodiment, the printed circuit board 560 is spaced-apart from the sidewall 512 through use of spacer elements, such as stand-off fasteners 562, and a fastening element, such as nut 549, with a male end portion of each stand-off fastener fastened to the nut 549. The fasteners 584 can extend through the printed circuit board 560 and threadably engage a female end portion of the stand-off fasteners 562. In other implementations, it is recognized that the printed circuit board can be mounted in a spaced-apart relationship with a side of the housing using other known fastening mechanisms and techniques. For example, a stand-off fastener or spacer can be mounted directly to the mounting plate 514. The fasteners 584 could then be used to fasten the printed circuit board 560 to the stand-off fastener or spacer.

Figure 33:
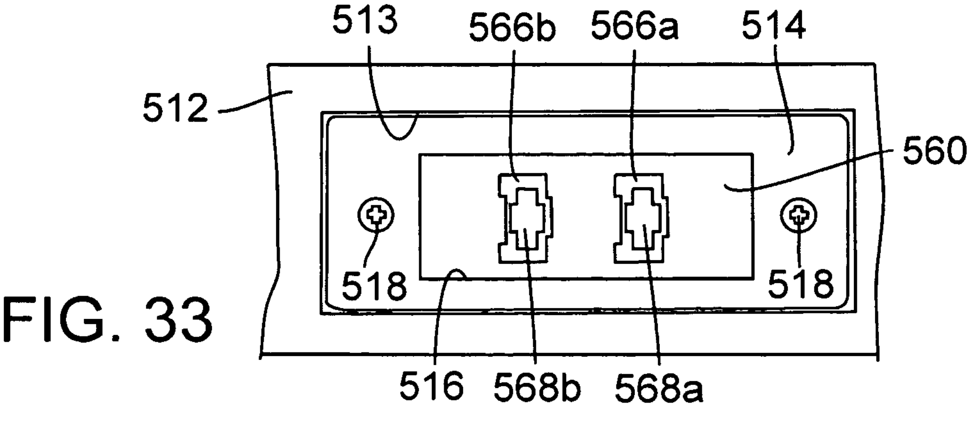
FIG. 33 is a plan view of a fuse module with the fuse carrier removed mounted within the fuse access passage shown in FIG. 32.

In the exemplary embodiments, the fuse module 500 can include electrical fittings, e.g., receptacles 566*a*, 566*b*, having sockets, or openings, 568*a*, 568*b* (see, for example, FIG. 33). As perhaps best shown in FIG. 33, the receptacles 566*a*, 566*b* are mounted to the printed circuit board 560 adjacent the fuse carrier access opening 516 such that the receptacles can be easily accessible through the opening 516. The receptacles 566*a*, 566*b* are electrically coupled with one or more electrical circuits on or in the printed circuit board. The receptacles and circuits can be electrically coupled; for example, via conductive elements (not shown) disposed within the sockets 568*a*, 568*b* and extending from the receptacles to electrically contact one or more electrical circuits. In one implementation, receptacle 566*a* is electrically coupled to an electrical circuit, e.g., power input circuit line, on the printed circuit board, which is electrically coupled to an electrical power supply input. Similarly, receptacle 566*b* can be electrically coupled to an electrical circuit, e.g., power output circuit line, on the printed circuit board, which is electrically coupled to power outlet bank 508*a*.

When the carrier 501 is inserted into the fuse carrier access opening 516 in the mounting plate 514, the sockets 568*a*, 568*b*, are sized, shaped and positioned to matingly receive prongs 537*a*, 537*b*, respectively, of the respective fuse carrier terminals 522*a*, 522*b*.

When inserted into the sockets 568*a*, 568*b*, the terminals 522*a*, 522*b* contact the conductive elements within the sockets to electrically couple the terminals 522*a*, 522*b* with the receptacles 566*a*, 566*b*, respectively, and thus one or more electrical circuits of the printed circuit board. Accordingly, when fuse 534 of carrier 500 is in a conductive state, a closed circuit is formed between the electrical power supply input and the outlet bank 508*a*. In other words, power supplied by the electrical power supply input is transmitted to the outlet bank 508*a* via the receptacle 566*a*, terminal 522*a*, fuse 534, terminal 522*b* and receptacle 566*b*.

When fuse 534 of fuse module 500 is determined to be blown, either by a fuse condition indicator or by visual inspection, the fuse carrier 501 can be replaced by a fuse carrier of the same type having an operable fuse. More specifically, the fuse carrier 501 housing the blown fuse can be unplugged, removed, or otherwise electrically disconnected, from the receptacles 566*a*, 566*b* by manually grasping and pulling the carrier away from the housing 504. A new fuse carrier having an operable fuse can then be plugged into the receptacles 566*a*, 566*b* to replace the old fuse carrier. In this manner, the fuse carrier, as described herein, can be easily replaced by a new carrier without tools and without requiring disassembly of the PDU.

Figure 34:
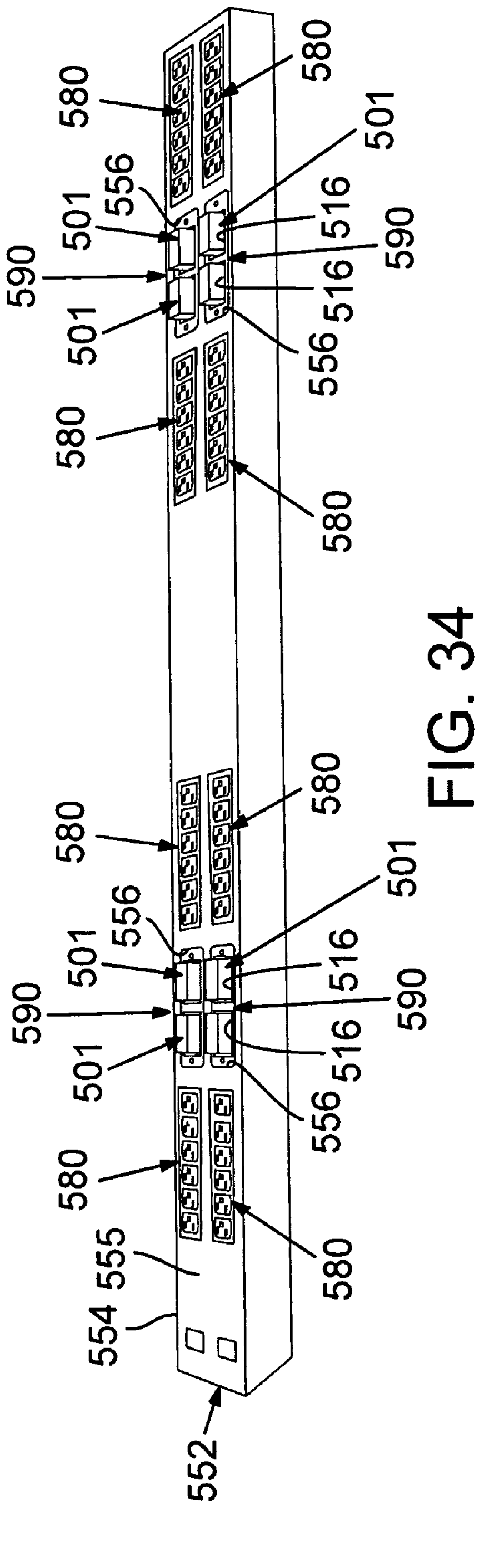
FIG. 34 is a perspective view of one exemplary embodiment of a power distribution unit having a plurality of fuse modules mounted to a housing of the power distribution unit where each fuse module has two fuse carriers.

Referring now to FIG. 34, an embodiment of a PDU 552 having a plurality of fuse modules 590 each with multiple fuse carriers 501 is shown. The PDU 552 is similar to PDU 502 except that PDU 552 includes multiple pairs of laterally arranged outlet banks 580 extending longitudinally along the front wall 554 of the PDU housing 555. Further, PDU 552 includes fuse access passages 556 penetrating the front wall 554 of the PDU housing 552 between two outlet banks 580 rather than penetrating a side wall adjacent a single outlet bank. Additionally, the fuse access passages 556 are longer, i.e., have a longitudinal dimension greater than the longitudinal dimension of the fuse access passages 513, to facilitate multiple fuse carriers 501.

The fuse modules 590 are similar to fuse modules 500*a*-500*f* described above, except that fuse modules 590 each accommodate two fuse carriers 501 to electrically fuse two outlets banks. For example, although not specifically shown, each fuse module 590 includes a single printed circuit board mountable to the housing in a manner similar to that described above and two pair of receptacles mounted to the printed circuit board. Further, as shown in FIG. 34, each fuse module 590 includes a longer mounting plate with one longer fuse carrier access opening through which two fuse carriers extend, or two separate fuse carrier access openings 516, as shown, with a single fuse carrier extendable through a respective opening.

Each pair of receptacles receives one of the two fuse carriers 501 to electrically couple the fuse carried by the fuse carrier to one of the outlet banks 580, such as an outlet bank longitudinally adjacent the respective fuse carrier. As with the fuse carriers 501 described in relation to fuse modules 500*a*-500*f*, each fuse carrier 501 of fuse modules 590 can be easily removed from the fuse module and replaced with another fuse carrier without disassembly or dismantling of the PDU 552.

Although embodiments of a fuse module having only one or two fuse carriers are shown, it is recognized that in some embodiments, a fuse module can have three or more carriers. Further, for fuse modules having more than one carrier, such as fuse module 590, the carriers need not be located longitudinally adjacent each other as shown, but can be arranged laterally adjacent each other.

It is recognized that the fuse carriers of the present disclosure can be made from relatively inexpensive materials such that replacing a carrier having a blown fuse with a carrier having an operable fuse is not cost prohibitive. For example, the housing, e.g., the cover and the base, can be made from an inexpensive polymeric material, such as hardened plastic. Further, the terminals and fuse connectors can be made from an inexpensive conductive material, such as copper or nickel.

The fuse module described herein provides modularity to fused electrical devices. For example, it may be determined that a fuse module having the features described herein would not be appropriate for a given application. In this situation, the fuse module can be easily removed from the fuse access passage and be replaced with another fuse module having similar or different features without modifying or dismantling the fused electrical device. In this manner, fuse modules described herein allow for modularity in a given electrical device and fuse module interchangeability.

In view of the many possible embodiments to which the principles of the disclosure may be applied, it should be recognized that the illustrated embodiments are only preferred examples and should not be taken as limiting in scope. Rather, the scope is defined by the following claims. We therefore claim as our invention all that comes within the scope and spirit of these claims.

We claim:

1. A power distribution unit for providing power to associated electronic equipment, the power distribution unit comprising:

a power distribution unit housing having at least one fuse access passage defined in the housing, the power distribution unit housing being configured to receive at least one power input;

at least one power output displaced along the power distribution housing and electrically couplable to the at least one power input; and at least one fuse module mounted to the housing and disposed at least partially within the at least one fuse access passage, the at least one fuse module being electrically couplable to the at least one power input and the at least one power output, wherein the at least one fuse module comprises at least one removably attachable fuse carrier that, when attached, electrically couples a fuse housed by the fuse carrier to the at least one power input and the at least one power output and extends from an interior of the housing, through the fuse access passage, to an exterior of the housing.

2. The power distribution unit of claim 1, wherein the fuse carrier comprises a fuse housing defining a substantially enclosed cavity, and wherein a fuse housed by the fuse carrier is positionable within the housing cavity.

3. The power distribution unit of claim 1, wherein the fuse carrier comprises at least first and second electrically conductive terminals where the first terminal is electrically coupled to a first end of a fuse housed by the fuse carrier and the second terminal is electrically coupled to a second end of a fuse housed by the fuse carrier.

4. A power distribution unit for providing power to associated electronic equipment, the power distribution unit comprising:

a power distribution unit housing having at least one fuse access passage defined in the housing, the power distribution unit housing being configured to receive at least one power input;

at least one power output displaced along the power distribution housing and electrically couplable to the at least one power input; and at least one fuse module mounted to the housing and disposed at least partially within the at least one fuse access passage, the at least one fuse module being electrically couplable to the at least one power input and the at least one power output, wherein the at least one fuse module comprises at least one removably attachable fuse carrier that, when attached, electrically couples a fuse housed by the fuse carrier to the at least one power input and the at least one power output, the fuse carrier comprising at least first and second electrically conductive terminals where the first terminal is electrically coupled to a first end of a fuse housed by the fuse carrier and the second terminal is electrically coupled to a second end of a fuse housed by the fuse carrier, the at least one fuse module comprising a printed circuit board disposed within the power distribution unit housing, the printed circuit board being in electrical power receiving communication with the at least one power input and electrical power transmitting communication with the at least one power outlet, and wherein the at least one fuse carrier is removably couplable to the printed circuit board to electrically couple the fuse housed by the fuse carrier to the at least one power input and the at least one power output via the printed circuit board.

5. The power distribution unit of claim 4, wherein the at least one fuse module comprises at least two receptacles mounted and electrically coupled to the printed circuit board, each of the at least two receptacles having a socket for receiving a respective one of the at least two electrically conductive terminals.

6. The power distribution unit of claim 1, wherein the at least one fuse module comprises a mounting plate covering at least a portion of the fuse access passage, the mounting plate having a fuse carrier access opening through which the fuse carrier is extendable.

7. The power distribution unit of claim 1, wherein the at least one fuse module comprises at least two fuse carriers.

8. The power distribution unit of claim 7, wherein the at least two fuse carriers comprise a first fuse carrier and a second fuse carrier, and the at least one power output comprises at least first and second power output, wherein, when attached, the first fuse carrier electrically couples a fuse housed by the first fuse carrier to the at least one power input and the first power output, and, when attached, the second fuse carrier electrically couples a fuse housed by the second fuse carrier to the at least one power input and the second power output.

9. The power distribution unit of claim 1, further comprising at least one fuse condition indicator in electrical communication with a fuse housed by the fuse carrier when the fuse carrier is attached.

10. The power distribution unit of claim 1, wherein the fuse is a cartridge-type fuse.

11. The power distribution unit of claim 10, wherein the fuse is rated for branch circuit protection in a power distribution system.

12. The power distribution unit of claim 1, wherein the power distribution unit housing has a plurality of fuse access passages, the at least one power output comprises a plurality of power outputs, and the at least one fuse module comprises a plurality of fuse modules.

13. The power distribution unit of claim 1, wherein, when attached, the at least one removably attachable fuse carrier is accessible from outside the power distribution unit housing.

14. The power distribution unit of claim 1, wherein the at least one removably attachable fuse carrier is removable from the power distribution unit without disassembly of the power distribution unit housing.

15. The power distribution unit of claim 1, wherein the at least one power output comprises a plurality of power outputs.

16. The power distribution unit of claim 15, wherein at least two of the plurality of power outputs are interconnected to form a ganged outlet module.

17. A method for providing overcurrent protection in a power distribution unit capable of receiving at least one power input and having at least one power output for providing power to associated electronic equipment, the power distribution unit having a housing with at least one fuse access passage penetrating the housing, the method comprising:

mounting at least one fuse module at least partially within the fuse access passage of the power distribution unit housing, the fuse module comprising a printed circuit board having at least two terminal sockets mounted thereon;

electrically connecting a first of the at least two terminal sockets on the printed circuit board to the at least one power input and electrically connecting a second of the at least two terminal sockets on the printed circuit board to the at least one power output; and removably attaching a fuse carrier to the at least two terminal sockets to electrically couple a fuse enclosed within the fuse carrier to the at least one power input and the at least one power output.

18. The method of claim 17, wherein the fuse carrier comprises a first fuse carrier enclosing a first fuse, the method further comprising:

determining the status of the first fuse enclosed within the first fuse carrier;

if the first fuse is in an inoperable state, detaching the first fuse carrier from the at least two terminal sockets; and removably attaching a second fuse carrier to the at least two terminal sockets to electrically couple a second fuse enclosed within the second fuse carrier to the at least one power input and the at least one power output.

19. The method of claim 18, wherein detaching the first fuse carrier comprises manually gasping the first fuse carrier and pulling the first fuse carrier out of engagement with the at least two terminal sockets.

20. The method of claim 18, wherein determining the status of the first fuse comprises visually inspecting a fuse condition indicator in electronic communication with the first fuse.

21. A power distribution unit for providing power to associated electronic equipment, the power distribution unit comprising:

a power distribution unit housing having a plurality of fuse access passages defined in the housing, the power distribution unit housing being configured to receive at least one power input;

a plurality of power outputs displaced along the power distribution housing and electrically couplable to the at least one power input; and a plurality of fuse modules mounted to the housing and disposed at least partially within the fuse access passages, the fuse modules being electrically couplable to the at least one power input and the power outputs, wherein the fuse modules comprise removably attachable fuse carriers, each carrier when attached electrically coupling a fuse housed by that carrier to the at least one power input and at least one of the power outputs.

22. The power distribution unit of claim 21, further comprising at least one fuse condition indicator in electrical communication with a fuse housed by one of the fuse carriers when that fuse carrier is attached.

23. The power distribution unit of claim 21, wherein, when attached, at least one of the removably attachable fuse carriers is accessible from outside the power distribution unit housing.

24. The power distribution unit of claim 21, wherein at least one of the removably attachable fuse carriers is removable from the power distribution unit without disassembly of the power distribution unit housing.

* * * * *